United States Patent
Nakagawa et al.

(10) Patent No.: US 8,273,499 B2
(45) Date of Patent: Sep. 25, 2012

(54) MEMBRANE-ELECTRODE ASSEMBLY FOR SOLID POLYMER ELECTROLYTE FUEL CELL

(75) Inventors: Takaki Nakagawa, Saitama (JP); Ryohei Ishimaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 596 days.

(21) Appl. No.: 12/474,828

(22) Filed: May 29, 2009

(65) Prior Publication Data

US 2010/0062311 A1  Mar. 11, 2010

(30) Foreign Application Priority Data

Jun. 3, 2008 (JP) .................................. 2008-145579

(51) Int. Cl.
*H01M 8/10* (2006.01)
(52) U.S. Cl. .................... 429/483; 429/493; 429/494
(58) Field of Classification Search .................. 429/479, 429/483, 491, 492, 493, 494
See application file for complete search history.

(56) References Cited

U.S. PATENT DOCUMENTS

| | | | |
|---|---|---|---|
| 7,396,607 B2 * | 7/2008 | Masaka et al. ................ | 429/493 |
| 2004/0044166 A1 * | 3/2004 | Rozhanskii et al. .......... | 528/86 |
| 2006/0280982 A1 * | 12/2006 | Kanaoka et al. ............... | 429/33 |
| 2007/0015024 A1 * | 1/2007 | Kanaoka et al. ............... | 429/33 |
| 2008/0160381 A1 * | 7/2008 | Kanaoka et al. ............... | 429/33 |
| 2008/0241628 A1 * | 10/2008 | Nakagawa et al. ............ | 429/33 |
| 2009/0130526 A1 * | 5/2009 | Higami et al. ................. | 429/33 |
| 2009/0134360 A1 * | 5/2009 | Komatsu et al. ............. | 252/500 |
| 2009/0149623 A1 * | 6/2009 | Higami et al. ................ | 528/125 |
| 2010/0152308 A1 * | 6/2010 | Kadota et al. ................. | 521/25 |
| 2010/0167161 A1 * | 7/2010 | Kadota et al. ................ | 429/483 |

FOREIGN PATENT DOCUMENTS

| | | |
|---|---|---|
| JP | 07-220741 A | 8/1995 |
| JP | 2001-342241 A | 12/2001 |
| JP | 2002-293889 A | 10/2002 |
| JP | 2003-113136 A | 4/2003 |
| JP | 2004-137444 A | 5/2004 |
| JP | 2004-345997 A | 12/2004 |
| JP | 2004-346163 A | 12/2004 |
| JP | 2004-346164 A | 12/2004 |
| JP | 2005-036125 A | 2/2005 |
| JP | 2005-060625 A | 3/2005 |
| WO | WO 2007/010731 A1 | 1/2007 |
| WO | 2008/143179 A1 * | 11/2008 |
| WO | WO 2008/143184 A1 * | 11/2008 |

* cited by examiner

*Primary Examiner* — Helene Klemanski
(74) *Attorney, Agent, or Firm* — Arent Fox LLP

(57) ABSTRACT

A membrane-electrode assembly for a solid polymer electrolyte fuel cell is provided that uses a proton conductive membrane having high proton conductivity and also superior heat resistance and chemical durability. A membrane-electrode assembly for a solid polymer electrolyte fuel cell is provided with an anode on one side of a proton conductive membrane and a cathode on another side thereof, and the proton conductive membrane is a sulfonated polyarylene containing a structure expressed by the general formula (1) below:

$$-R^s-Z-R^h \quad (1)$$

In the formula (1), Z represents at least one structure selected from the group consisting of $-CO-$, $-SO_2-$, and $-SO-$; $R^s$ represents a direct bond or any divalent organic group; and $R^h$ represents a nitrogen-containing heterocyclic group.

16 Claims, 2 Drawing Sheets

MEMBRANE-ELECTRODE ASSEMBLY FOR SOLID POLYMER ELECTROLYTE FUEL CELL

This application is based on and claims the benefit of priority from Japanese Patent Application No. 2008-145579, filed on 3 Jun. 2008, the content of which is incorporated herein by reference.

BACKGROUND OF THE INVENTION

1. Field of the Invention

The present invention relates to a membrane-electrode assembly for a solid polymer electrolyte fuel cell that provides high durability in generating electricity at high temperatures and superior proton conductivity in the low humidity region.

2. Related Art

A fuel cell is a power generation device that causes an electrochemical reaction of hydrogen, which is obtained from hydrogen gas or by reforming various hydrocarbon fuels (natural gas, methane, etc.), and oxygen in air, whereby electricity is output directly. In addition, the fuel cells have been attracting attention as a pollution-free power generation system that can directly convert chemical energy of fuels into electric energy with high efficiency.

The fuel cells are constructed from a pair of electrodes (fuel and air electrodes) supporting a catalyst and a proton-conductive electrolyte membrane (hereinafter referred to as a "proton conductive membrane") sandwiched between the electrodes. In the fuel cells, after hydrogen is separated into hydrogen ions and electrons by the catalyst of the fuel electrode, the hydrogen ions travel through the proton conductive membrane and reacts with oxygen at the air electrode thereby to form water.

In recent years, there has become a demand for fuel cells to have higher power generation performance. In order to enhance power generation performance, operating at higher temperatures during power generation is required. Therefore, a proton conductive membrane for use in fuel cells is sought having high proton conductivity under a wide range of environments, in particular under high temperature environments.

Polymers having a sulfonic acid group have been conventionally used for such a proton conductive membrane. The present inventors have also proposed a certain polymer having a sulfonic acid group as a proton conductive membrane with high proton conductivity (e.g., see Patent Documents 1 to 4).

[Patent Document 1] Japanese Unexamined Patent Application, First Publication No. 2004-345997
[Patent Document 2] Japanese Unexamined Patent Application, First Publication No. 2004-346163
[Patent Document 3] Japanese Unexamined Patent Application, First Publication No. 2004-346164
[Patent Document 4] International Publication WO 07/010,731 Pamphlet

SUMMARY OF THE INVENTION

However, for proton conduction membranes consisting of a polymers having a sulfonic acid group that have coming into conventional use, there are cases in which power generation output of a fuel cell decreases due to the proton conductivity decreasing under high temperature environments; therefore, it was necessary to provide an upper limit for the temperature during fuel cell power generation. Furthermore, some of these polymers decrease the proton conductivity under low humidity environments.

In addition, a cause of performance deterioration is known that is a result of hydrogen peroxide generating in the fuel cells due to fuel oxidation in the cells during power generation, and then the generated hydrogen peroxide forming an active species such as a hydroxyl radical, which induces decomposition of the proton conductive membrane. Therefore, an improvement in durability related to chemical degradation is also demanded for the proton conductive membrane.

Accordingly, a membrane-electrode assembly for a solid polymer electrolyte fuel cell has been sought that uses a proton conductive membrane that excels in heat resistance and chemical durability, while possessing high proton conductivity similar to those existing currently.

The present inventors have thoroughly investigated to solve the problems described above. As a result, it has been discovered that proton conductivity under a low humidity environment can be improved by introducing a nitrogen-containing heterocyclic group into a sulfonated polyarylene through an electron-withdrawing functional group to decrease the electron density of heterocycle and to suppress basicity, thereby achieving the present invention. More specifically, the present invention provides the following.

In a first aspect of the present invention, a membrane-electrode assembly for a solid polymer electrolyte fuel cell is provided with an anode electrode on one side and a cathode electrode on another side of a proton conductive membrane, and the proton conductive membrane is formed of a sulfonated polyarylene containing a structure expressed by the general formula (1) below:

$$R^s\text{—}Z\text{—}R^h \qquad (1)$$

In the formula (1), Z represents at least one structure selected from the group consisting of —CO—, —SO$_2$—, and —SO—; R$^s$ represents a direct bond or any divalent organic group; and R$^h$ represents a nitrogen-containing heterocyclic group.

According to a second aspect, in the membrane-electrode assembly for a solid polymer electrolyte fuel cell according to the first aspect, the nitrogen-containing heterocyclic group in the general formula (1) is at least one group selected from the group consisting of pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline groups, and derivatives of nitrogen-containing heterocyclic groups thereof.

According to a third aspect, in the membrane-electrode assembly for a solid polymer electrolyte fuel cell according to the first or second aspect, the sulfonated polyarylene further contains a structure having a sulfonic acid group expressed by the general formula (2) below:

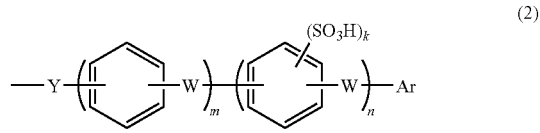

In the formula (2), Y represents at least one structure selected from the group consisting of —CO—, —SO$_2$—, —SO—, —CONH—, —(CF$_2$)$_l$— (l: an integer of 1 to 10), and —C(CF$_3$)$_2$—; W represents a direct bond or at least one structure selected from the group consisting of —(CH$_2$)$_l$— (l: an integer of 1 to 10), —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H (h: an integer of 1 to 12); m represents an integer of 0 to 10; n represents an integer of 0 to 10; and k represents an integer of 1 to 4.

According to a fourth aspect, in the membrane-electrode assembly for a solid polymer electrolyte fuel cell according to any one of the first to third aspects, the sulfonated polyarylene contains a structure expressed by the general formula (3) below and a structure expressed by the general formula (4) below:

(3)

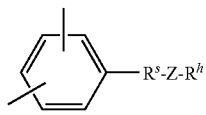

In the formula (3), Z, $R^s$, and $R^h$ are similar to those of the general formula (1) described above;

(4)

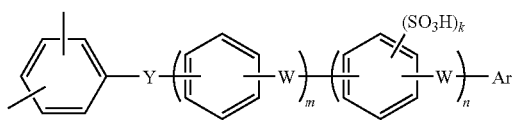

In the formula (4), Y, W, Ar, m, n, and k are similar to those of the general formula (2) described above. Among the single lines at the edges of structural units, those displaying no substituent at one end indicate a connection with an adjacent structural unit.

According to a fifth aspect, in the membrane-electrode assembly for a solid polymer electrolyte fuel cell according to the fourth aspect, the sulfonated polyarylene further contains a structure expressed by the general formula (5) below:

In the formula (5), A and D each independently represent at least one structure selected from the group consisting of a direct bond, —O—, —S—, —CO—, —SO$_2$—, —SO—, —CONH—, —COO—, —(CF$_2$)$_i$— (i: an integer of 1 to 10), —(CH$_2$)$_j$— (j: an integer of 1 to 10), —CR'$_2$— (R' represents an aliphatic hydrocarbon group, aromatic hydrocarbon group, or halogenated hydrocarbon group), cyclohexylidene group, and fluorenilidene group; B independently represents an oxygen or sulfur atom; $R^1$ to $R^{16}$ may be identical or different from each other and represent at least one atom or group selected from the group consisting of a hydrogen atom, fluorine atom, alkyl groups, partially or entirely halogenated alkyl groups, allyl groups, aryl groups, nitro groups, and nitrile groups; s and t represent an integer of 0 to 4; and r represents an integer of 0 or at least 1. Among the single lines at the edges of structural units, those displaying no substituent at one end indicate a connection with an adjacent structural unit.

According to a sixth aspect, in the membrane-electrode assembly for a solid polymer electrolyte fuel cell according to (5)

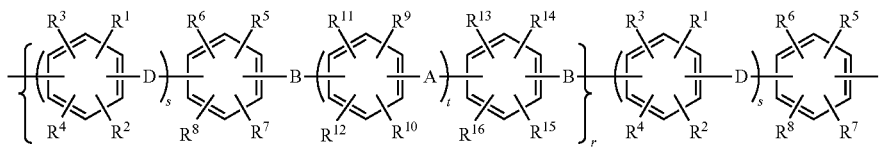

the fifth aspect, the sulfonated polyarylene contains a structure expressed by the general formula (6) below:

(6)

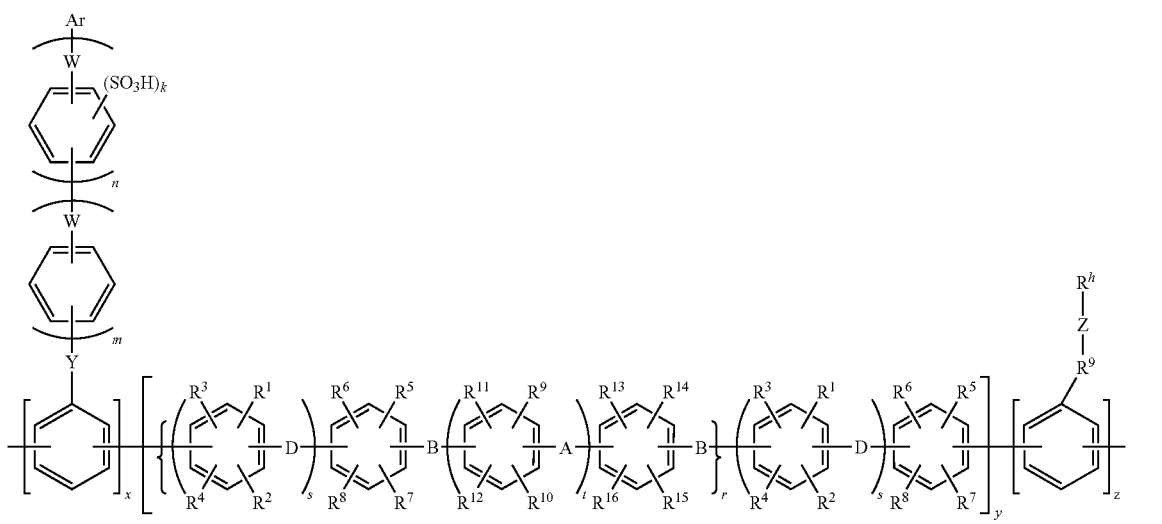

In the formula (6), A, B, D, W, Y, Z, Ar, k, m, n, r, s, t, $R^h$, $R^s$, and $R^1$ to $R^{16}$ are similar to those of the general formulas (1), (2) and (5), respectively. x, y and z each represent a mol fraction provided that x+y+z=100 mol %; x is 99 to 85 mol %, y is 15 to 1 mol %, and z is 15 to 0.01 mol %. Among the single lines at the edges of each structural unit, those displaying no substituent at one end indicate a connection with an adjacent structural unit.

In accordance with the present invention, the electron density of heterocycles decreases and the basicity is suppressed by introducing the nitrogen-containing heterocyclic group into the sulfonated polyarylene, which is used as a proton conductive membrane, through an electron-withdrawing functional group. Consequently, heat resistance and chemical durability can be enhanced and also proton conductivity can be improved under low humidity environments.

Furthermore, in accordance with the present invention, a nitrogen-containing heterocyclic group is introduced into a polyarylene that essentially exhibits superior hot water resistance, has a high sulfonic acid concentration, and represents excellent proton conductivity; therefore, a proton conductive membrane is obtained that has stable power generating performance, even under higher temperatures without degrading proton conductivity. Consequently, when it is used as a proton conductive membrane in fuel cells, power generation becomes possible under a wide range of temperatures and humidity, in particular under higher temperatures, and thus power generation output can be increased. Furthermore, even for a case of utilizing under higher temperatures, since stable power generation can be demonstrated as a result of the sulfonic acid group existing stably, the lifespan of fuel cells can be significantly extended.

DETAILED DESCRIPTION OF THE INVENTION

Figure 1:
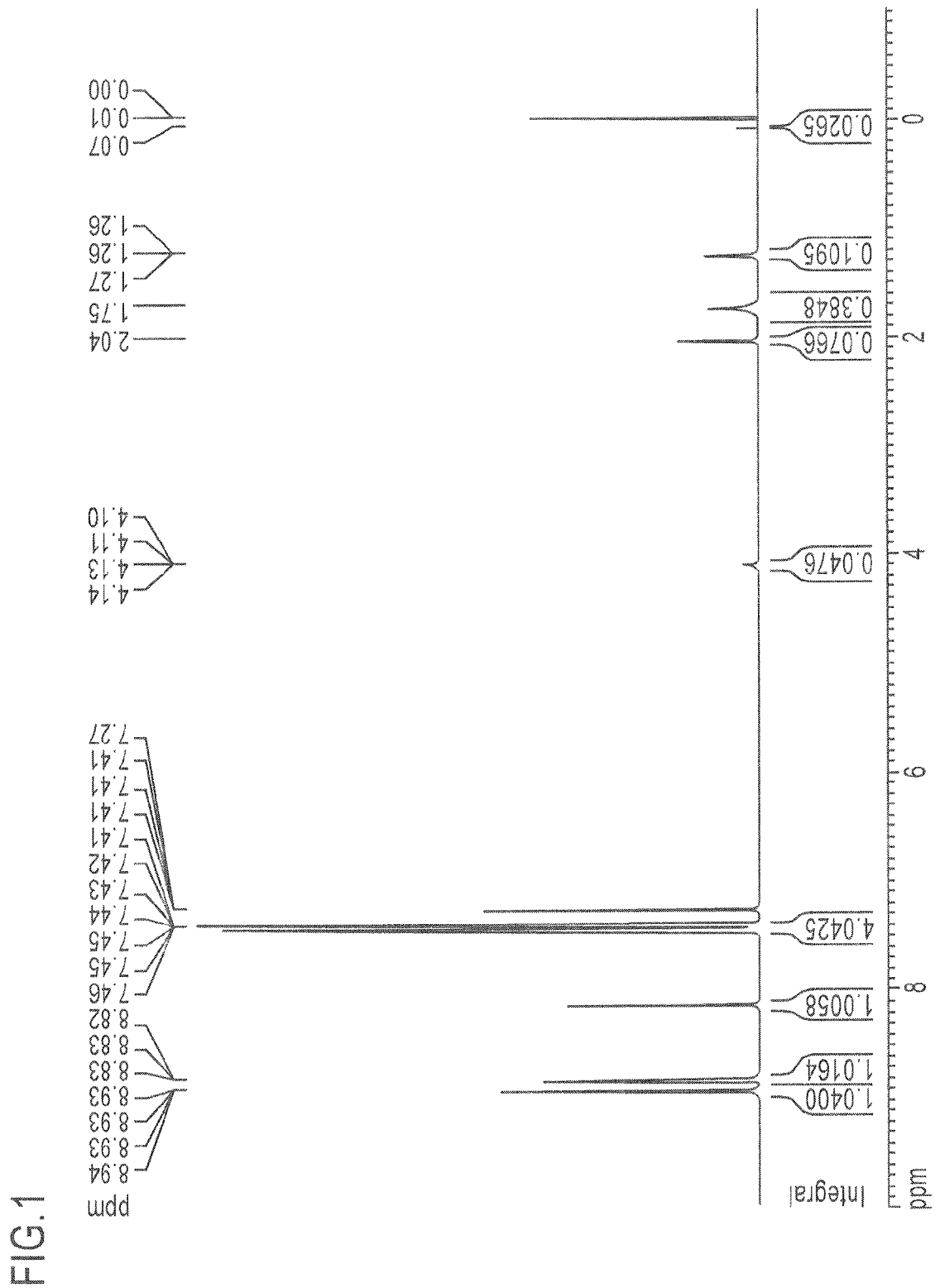
FIG. 1 is an $^1$H-NMR spectrum of the compound obtained in Synthesis Example 1.

The present invention will be explained with respect to best mode thereof below.
Sulfonated Polyarylene
The sulfonated polyarylene, which configures the proton conductive membrane of the membrane-electrode assembly for a solid polymer electrolyte fuel cell according to the present invention, is characterized in that a structure having a nitrogen-containing heterocyclic group is introduced through an electron-withdrawing functional group.
Structure Having Nitrogen-Containing Heterocyclic Group
The sulfonated polyarylene of the present invention includes a structure having a nitrogen-containing heterocyclic group expressed by the general formula (1) below.

$$—R^s—Z—R^h \qquad (1)$$

In the formula (1), Z is not particularly limited as long as it is an electron-withdrawing group, and preferably represents at least one structure selected from the group consisting of —CO—, —SO$_2$—, and —SO—.

$R^s$ represents a direct bond or any divalent organic group without particular limitation. The divalent organic group is preferably a hydrocarbon group having 1 to 20 carbon atoms, and specifically is an alkylene group such as a methylene and ethylene group and aromatic groups such as phenylene group.

$R^h$ represents a nitrogen-containing heterocyclic group, and is exemplified by a nitrogen-containing structure of five- or six-membered rings. Furthermore, the number of nitrogen atoms in the heterocycle is not particularly limited as long as it is one or more. The heterocycle may contain oxygen and/or sulfur in addition to nitrogen.

The nitrogen-containing heterocyclic group to constitute the $R^h$ is specifically exemplified by pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline groups, and those groups having a structure of the derivatives of these nitrogen-containing heterocyclic groups of which a hydrogen atom, binding to carbon or nitrogen, is removed.

These nitrogen-containing heterocyclic groups may have a substituent, examples of the substituent including alkyl groups such as methyl, ethyl and propyl groups, aryl groups such as phenyl, toluoyl and naphthyl groups, cyano group, and a fluorine atom.

It is also preferred that the sulfonated polyarylene of the present invention has a structure expressed by the general formula (3) below (hereinafter referred to as "structural unit (3)").

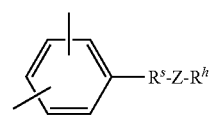

$$(3)$$

Z, $R^s$, and $R^h$ in the formula (3) are similar to those of the formula (1). Among the single lines at the edges of each structural unit, those displaying no substituent at one end indicate a connection with an adjacent structural unit.

It is preferred in the formula (3) that the nitrogen-containing heterocyclic group $R^h$ is a pyridine group. The pyridine group represents a lower basicity of nitrogen N among nitrogen-containing heterocycles and, therefore, can increase the proton conductivity under a low humidity environment.

It is also preferred in the formula (3) that Z is —CO— or —SO$_2$—. In a case where —CO— is combined with the pyridine group, a thermally stable structure tends to occur due to a conjugation-induced stabilizing effect. In addition, in the case of Z being —SO$_2$—, as a consequence of the nitrogen basicity being able to be further suppressed by lowering the electron density, the proton conductivity can be particularly enhanced under low humidity environments.

Although it is preferred from the viewpoint of stability that the aromatic ring and the electron-withdrawing group Z of the main chain connect directly, any divalent organic group (i.e. $R^s$) may be interposed therebetween within a range that does not inhibit the effect of the present invention. Here, a divalent organic group having 1 to 20 carbon atoms is preferably exemplified as the interposing structure.

Structure Containing Sulfonic Acid Group

The sulfonated polyarylene of the present invention preferably has a structure having a sulfonic acid group expressed by the general formula (2) below.

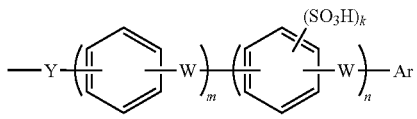
(2)

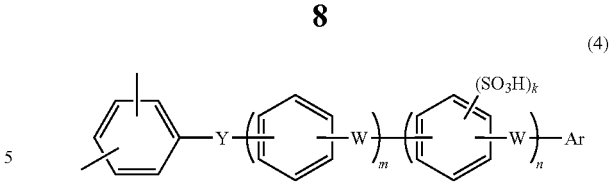
(4)

In the general formula (2), Y represents at least one structure selected from the group consisting of —CO—, —SO$_2$—, —SO—, —CONH—, —COO—, —(CF$_2$)$_l$— (l: an integer of 1 to 10), and —C(CF$_3$)$_2$—. Among these, —CO— and —SO$_2$— are preferable.

W represents a direct bond or at least one structure selected from the group consisting of —(CH$_2$)$_l$— (l: an integer of 1 to 10), —C(CH$_3$)$_2$—, —O—, and —S—. Among these, a direct bond and —O— are preferable.

Ar represents an aromatic group having a substituent expressed by —SO$_3$H, —O(CH$_2$)$_h$SO$_3$H, or —O(CF$_2$)$_h$SO$_3$H (h: an integer of 1 to 12). More specifically, phenyl, naphthyl, anthryl, and phenanthryl groups, etc. can be exemplified as the aromatic group. Among these groups, phenyl and naphthyl groups are preferable. It is necessary that the aromatic group is substituted by at least one substituent expressed by —SO$_3$H, —O(CH$_2$)$_h$SO$_3$H, or —O(CF$_2$)$_h$SO$_3$H described above and preferably is substituted by at least two in the case of a naphthyl group.

m represents an integer of 0 to 10, preferably 0 to 2; n represents an integer of 0 to 10, preferably 0 to 2; and k represents an integer of 1 to 4. The preferable combination between the values of m, n and k and the structures of Y, W and Ar are exemplified as follows:

(1) m=0, n=0 and a structure where Y is —CO— and Ar is a phenyl group having —SO$_3$H as a substituent;

(2) m=1, n=0 and a structure where Y is —CO—, W is —O—, and Ar is a phenyl group having —SO$_3$H as a substituent;

(3) m=1, n=1, k=1 and a structure where Y is —CO—, W is —O—, and Ar is a phenyl group having —SO$_3$H as a substituent;

(4) m=1, n=0 and a structure where Y is —CO—, W is —O—, and Ar is a naphthyl group having two —SO$_3$H as a substituent;

(5) m=1, n=0 and a structure where Y is —CO—, W is —O—, and Ar is a phenyl group having —O(CH$_2$)$_4$SO$_3$H as a substituent, etc.

The sulfonated polyarylene of the present invention preferably has a structure having a sulfonic acid group expressed by the general formula (4) below (hereinafter referred to as "structural unit (4)").

Y, W, Ar, m, n, and k in the formula (4) are similar to those of the formula (2). In addition, among the single lines at the edges of each structural unit, those displaying no substituent at one end indicate a connection with an adjacent structural unit.

Structure of Polyarylene

The sulfonated polyarylene of the present invention preferably has a polyarylene structure expressed by the general formula (5) below (hereinafter referred to as "hydrophobic unit" or "structural unit (5)").

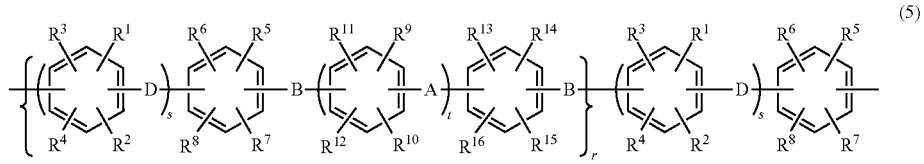
(5)

In the formula (5), A and D each independently represent at least one structure selected from the group consisting of a direct bond, —O—, —S—, —CO—, —SO$_2$—, —SO—, —CONH—, —COO—, —(CF$_2$)$_i$— (i: an integer of 1 to 10), —(CH$_2$)$_j$— (j: an integer of 1 to 10), —CR'$_2$— (R' represents an aliphatic hydrocarbon group, aromatic hydrocarbon group, or halogenated hydrocarbon group), cyclohexylidene group, and fluorenilidene group; B independently represents an oxygen or sulfur atom; $R^1$ to $R^{16}$ may be identical or different from each other and represent at least one atom or group selected from the group consisting of a hydrogen atom, fluorine atom, alkyl groups, partially or entirely halogenated alkyl groups, allyl groups, aryl groups, nitro groups, and nitrile groups; s and t represent an integer of 0 to 4; and r represents an integer of 0 or at least 1. In addition, among the single lines at the edges of each structural unit, those displaying no substituent at one end indicate a connection with an adjacent structural unit.

Here, specific examples of the structure expressed by —CR'$_2$— include methyl, ethyl, propyl, isopropyl, butyl, isobutyl, t-butyl, propyl, octyl, decyl, octadecyl, phenyl, trifluoromethyl groups, etc.

Among those described above, A and D are preferably a direct bond, —CO—, —SO$_2$—, —CR'$_2$— (R' represents an aliphatic hydrocarbon group, aromatic hydrocarbon group, or halogenated hydrocarbon group), cyclohexylidene group, fluorenilidene group, or —O—.

B is independently an oxygen or sulfur atom, and preferably an oxygen atom. $R^1$ to $R^{16}$ may be identical or different from each other and represent at least one atom or group selected from the group consisting of a hydrogen atom, fluorine atom, alkyl groups, partially or entirely halogenated alkyl groups, allyl groups, aryl groups, nitro groups, and nitrile groups.

Methyl, ethyl, propyl, butyl, amyl, hexyl, cyclohexyl, octyl groups, etc. can be exemplified as the alkyl group. Trifluoromethyl, pentafluoroethyl, perfluoropropyl, perfluorobutyl, perfluoropentyl, perfluorohexyl groups, etc. can be exemplified as the halogenated alkyl group. A propenyl group, etc. can be exemplified as the allyl group and phenyl, pentafluorophenyl groups, etc. can be exemplified as the aryl group.

s and t represent an integer of 0 to 4. r represents an integer of 0 or at least 1, and the upper limit thereof is usually 100 and preferably 1 to 80. The preferable combination between the values of s, t and the structures of A, B, D, $R^1$ to $R^{16}$ is exemplified as follows:

(1) s=1, t=1 and a structure where A is —$CR'_2$— (R' represents an aliphatic hydrocarbon group, aromatic hydrocarbon group, or halogenated hydrocarbon group), cyclohexylidene group, or fluorenilidene group, B is an oxygen atom, D is —CO— or —$SO_2$—, and $R^1$ to $R^{16}$ are a hydrogen or fluorine atom;

(2) s=1, t=0 and a structure where B is an oxygen atom, D is —CO— or —$SO_2$—, and $R^1$ to $R^{16}$ are a hydrogen or fluorine atom;

(3) s=0, t=1 and a structure where A is —$CR'_2$— (R' represents an aliphatic hydrocarbon group, aromatic hydrocarbon group, or halogenated hydrocarbon group), cyclohexylidene group, or fluorenilidene group, B is an oxygen atom, and $R^1$ to $R^{16}$ are a hydrogen atom, fluorine atom, or nitrile group.

Structure of Polymer

More preferably, the sulfonated polyarylene polymer of the present invention has a structure expressed by the general formula (6).

nation of the above-mentioned structural units (3), (4) and (5). Therefore, the ion-exchange capacity can be adjusted by changing the stocking ratio and species of precursors (monomer, oligomer), and introducing the structural units (3) to (5) at the stage of polymerization.

In general, the structural unit (4) increases, and the ion-exchange capacity rises, and thus the proton conductivity is raised; however, the water resistance degrades. On the other hand, when the structural unit (4) decreases, the ion-exchange capacity lowers, and thus the water resistance is enhanced; however, the proton conductivity decreases.

By including the structural unit (3), the stability of the sulfonic acid group is improved under high temperature conditions and, as a result, the heat resistance is improved. The nitrogen atom in the nitrogen-containing heterocyclic aromatic compounds has basicity, and thus forms an ionic interaction between the sulfonic acid group. As a result, the stability of the sulfonic acid group is enhanced, and desorption of the sulfonic acid group is suppressed under high temperature conditions. In addition, the cross-linking reaction between polymer molecules due to the sulfonic acid group can be similarly suppressed under high temperature conditions. The nitrogen-containing heterocyclic aromatic compounds are compounds having a basicity of strength suitable

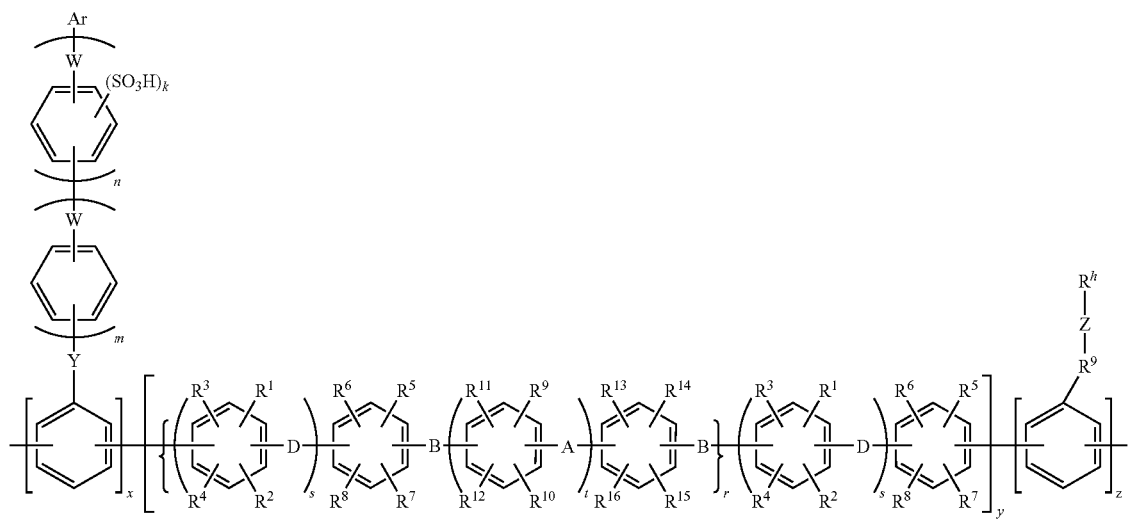

(6)

In the formula (6), A, B, D, W, Y, Z, Ar, k, m, n, r, s, t, $R^h$, $R^s$, and $R^1$ to $R^{16}$ are similar to those of the general formulas (1), (2) and (5), respectively. x, y and z each represent a mol fraction provided that x+y+z=100.

Here, x is 85 to 99 mol %, preferably 90 to 97 mol %, and more preferably 94 to 96 mol %. y is 1 to 15 mol %, preferably 1 to 10 mol %, and more preferably 1 to 5 mol %; and z is 0.001 to 50 mol %, preferably 0.1 to 25 mol %, and more preferably 1 to 10 mol %.

The ion-exchange capacity of the sulfonated polyarylene polymer of the present invention is usually 0.3 to 5 meq/g, preferably 0.5 to 3 meq/g, and more preferably 0.8 to 2.8 meq/g. Provided that the ion-exchange capacity is at least 0.3 meq/g, the proton conductivity can increase and the power generation performance can be improved. On the other hand, sufficiently high water resistance can be obtained provided that it is no greater than 5 meq/g.

The ion-exchange capacity described above can be adjusted by changing the species, percent used, and combito be able to realize these effects without impairing the proton conductivity. Furthermore, the electron density of heterocycles is lowered and the basicity of nitrogen is suppressed by introducing the nitrogen-containing heterocyclic ring through an electron-withdrawing group, as result of which the proton conductivity is improved under the low humidity region.

The structural unit (5) may be an arbitrary component, and the remaining of the polymer excluding the components of the structural units (3) and (4) corresponds to the amount of the structural unit (5). The structural unit (5) may also not be included. When the structural unit (5) is included, the adjustment of molecular weight and the adjustment of contents of the above-mentioned repeating units, etc. are likely to be easy, and polymers are obtainable with thermal and chemical stability.

The molecular weight of the polymer of the present invention is 10000 to 1000000 by a weight-average molecular weight based on a polystyrene standard by means of gel permeation chromatography (GPC), preferably 20000 to 800000, more preferably 50000 to 300000.

Method of Producing Sulfonated Polyarylene

The method of producing the sulfonated polyarylene of the present invention is not particularly limited, and three methods of method A, method B and method C can be used as shown below.

Method A

For example, similarly to the method described in Japanese Unexamined Patent Application, First Publication No. 2004-137444, synthesis is possible by copolymerizing the monomer (A') described below, the monomer (B') expressed by the general formula (B') described below, and the monomer (C') expressed by the general formula (C') described below to produce a polymer having a sulfonate ester group, then de-esterifying the sulfonate ester group to convert the sulfonic acid ester group into a sulfonic acid group.

Monomer (A')

The monomer (A') is a compound in which the sulfone group in the structure expressed by the general formula (A') below is esterified and induces the structure expressed by the general formula (2) or (4) in the sulfonated polyarylene.

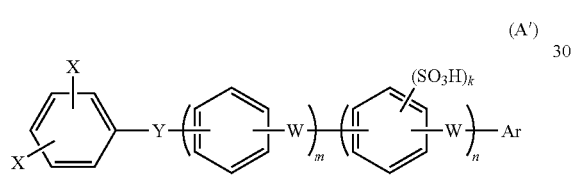

(A')

In the formula (A'), Y, W, Ar, m, n, and k are similar to those of the general formula (2), respectively. X represents an atom or group selected from the group consisting of a chlorine atom, bromine atom, and $OSO_2Rb$ (Rb represents an alkyl group, fluorine-substituted alkyl group, or aryl group).

In the structure expressed by the general formula (A'), the specific compound, of which sulfone group is esterified, is exemplified by the compounds expressed by the chemical formula below and the sulfonic acid esters described in Japanese Unexamined Patent Application, First Publication Nos. 2004-137444, 2004-345997, and 2004-346163.

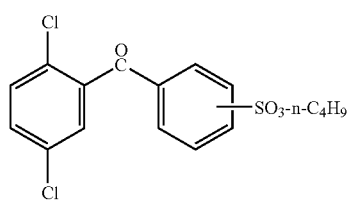

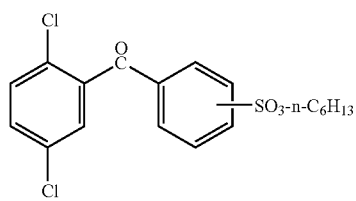

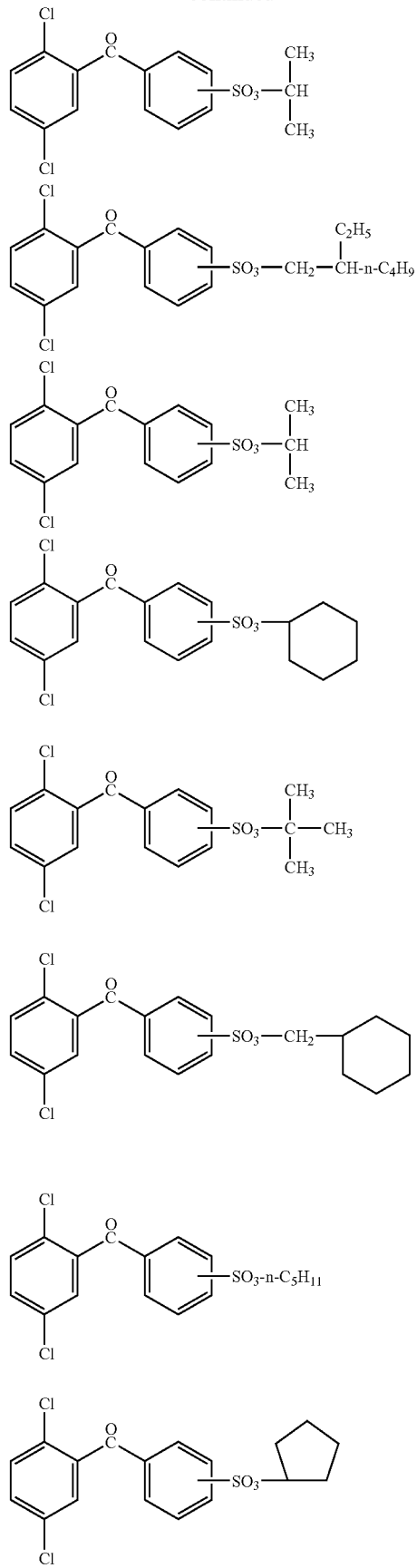

-continued

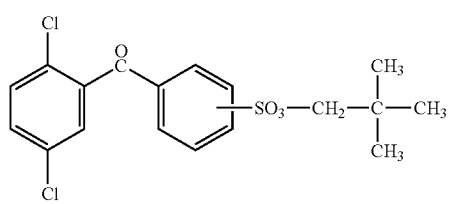
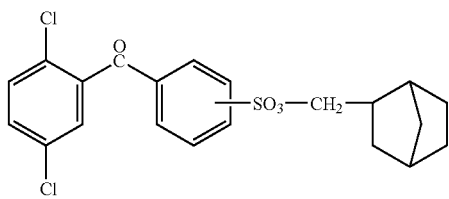

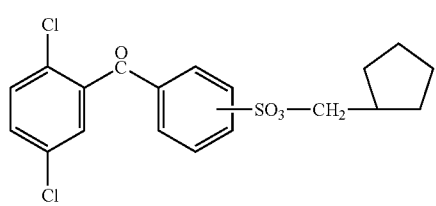
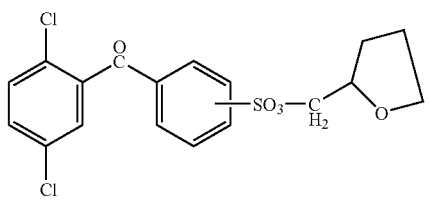

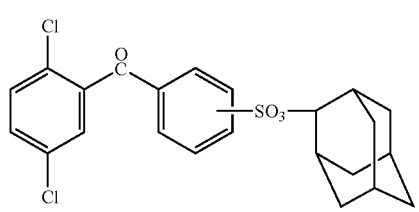
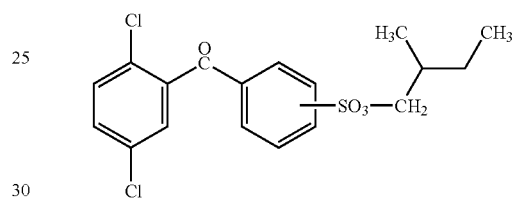

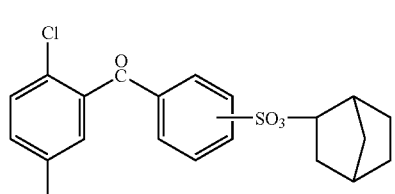
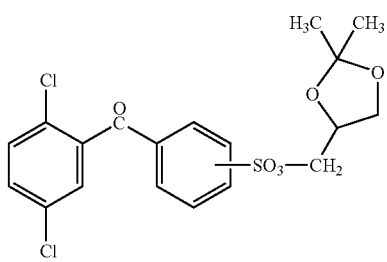

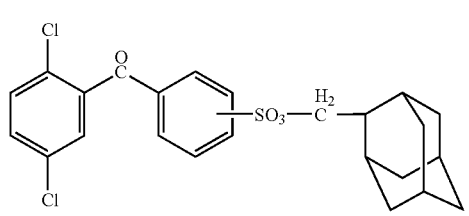

In the structure expressed by the general formula (A'), the sulfonic acid ester structure of the compounds, of which the sulfonic group is esterified, usually attaches to a meta-position of the aromatic ring.

Monomer (B')

The monomer (B') is a compound having a structure expressed by the general formula (B') below and induces the structure expressed by the general formula (5) in the sulfonated polyarylene.

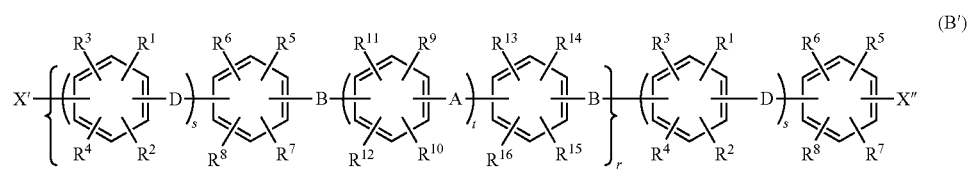

In the formula (B'), X' and X" represent an atom or group selected from the group consisting of a chlorine atom, bromine atom, and $OSO_2Rb$ (Rb represents an alkyl group, fluorine-substituted alkyl group, or aryl group). $R^1$ to $R^{16}$, A, B, D, s, t, and r are the same as those of the general formula (B).

In a case where r is 0 in the formula (B'), for example, 4,4'-dichlorobenzophenone, 4,4'-dichlorobenzanilide, 2,2-bis(4-chlorophenyl)difluoro methane, 2,2-bis(4-chlorophenyl)-1,1,1,3,3,3-hexafluoropropane, 4-chlorobenzoic acid-4-chlorophenyl ester, bis(4-chlorophenyl)sulfoxide, bis(4-chlorophenyl)sulfone, 2,6-dichlorobenzonitrile can be exemplified as specific examples of the monomer (B'). Compounds in which a chlorine atom of these compounds is substituted with a bromine or iodine atom can be exemplified.

In addition, in a case where r is 1 in the general formula (B'), the compounds shown below and also the compounds described in Japanese Unexamined Patent Application, First Publication No. 2003-113136 may be exemplified.

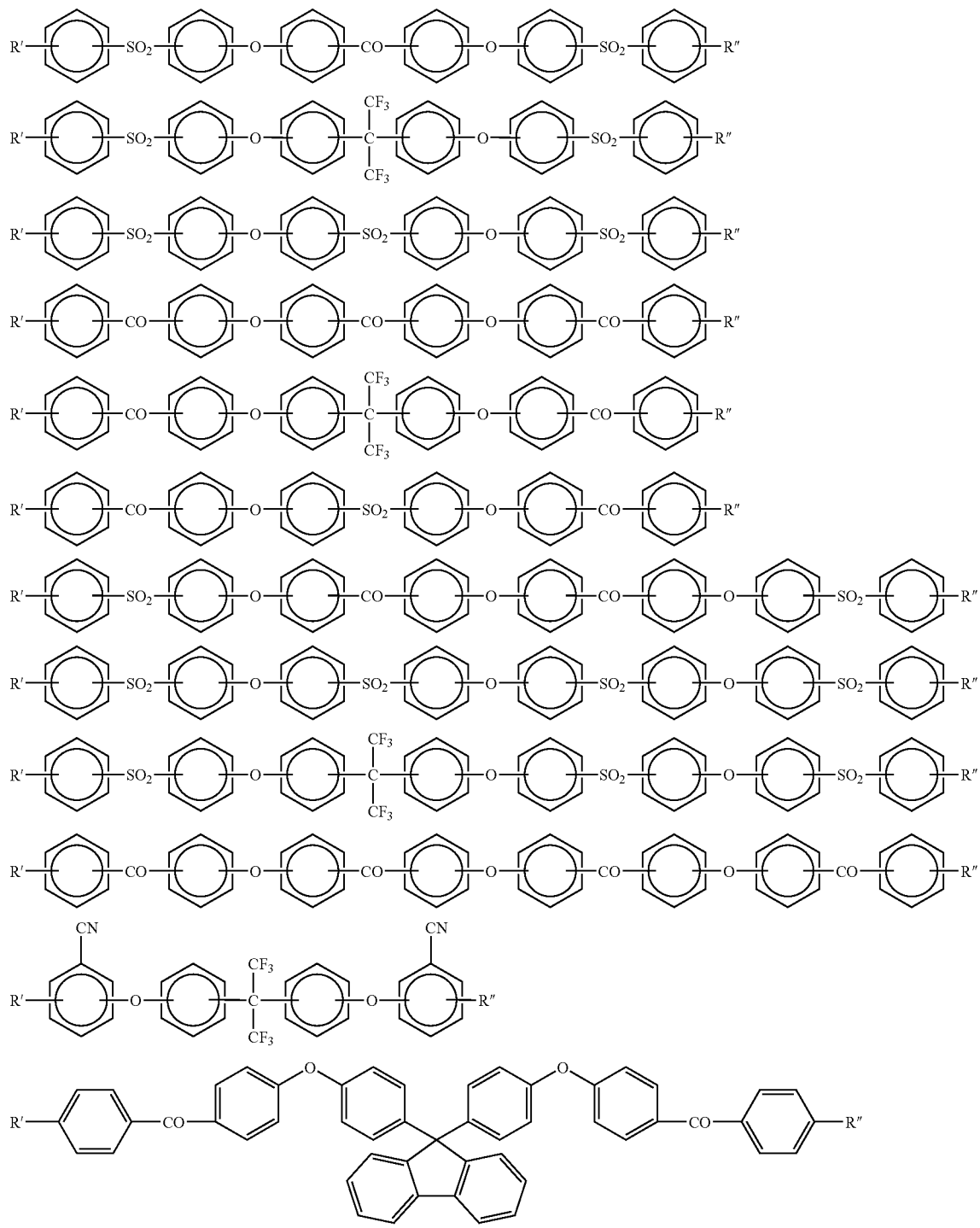

In addition, in a case where r is no less than 2 in the general formula (Be), the compounds having the structure below may also be exemplified.
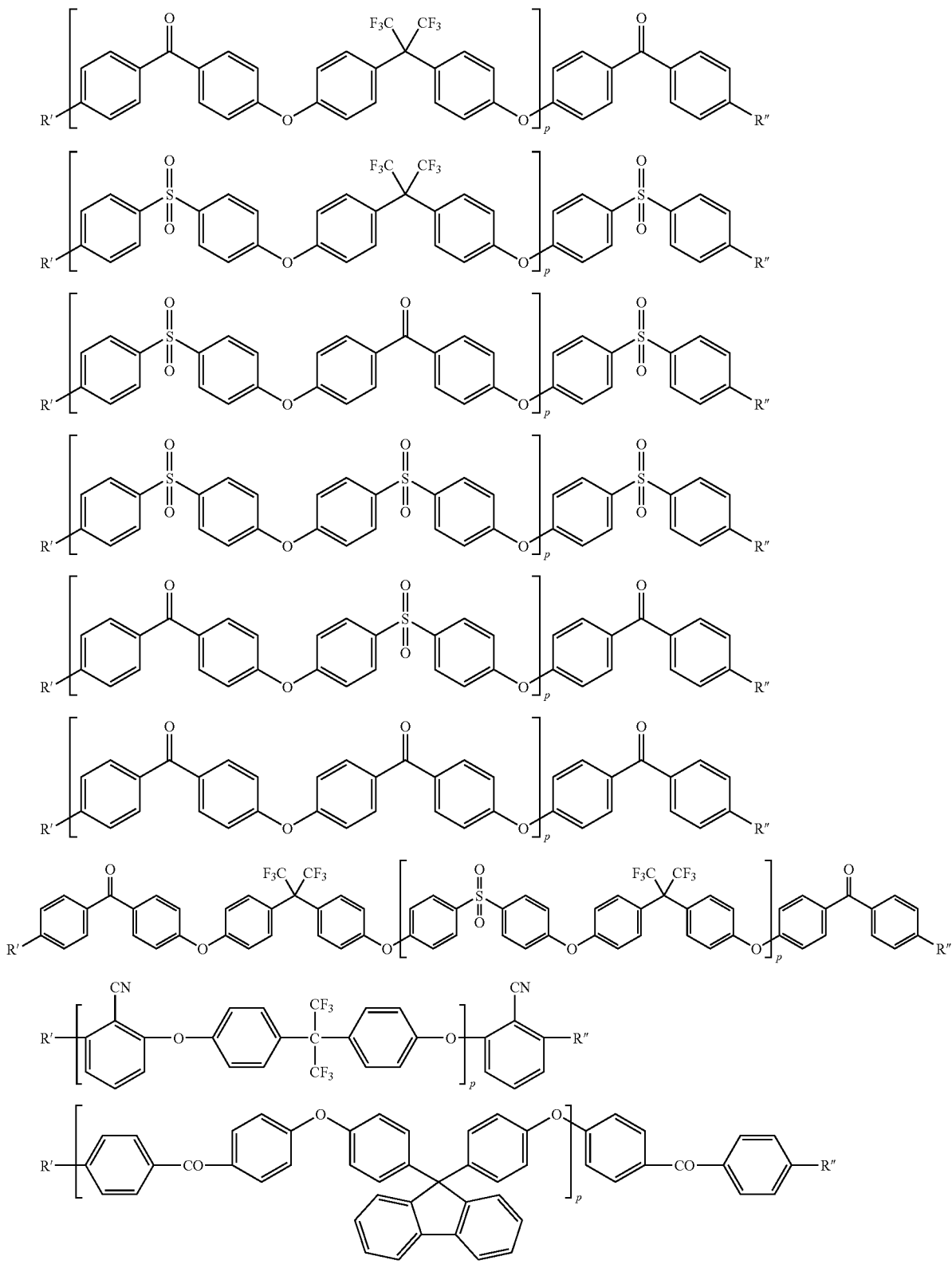

Monomer (C')

The monomer (C') is a compound having a structure expressed by the general formula (C') and induces the structure expressed by the general formula (1) or (3) in the sulfonated polyarylene.

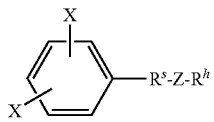

(C')

In the formula (C'), X represents an atom or group selected from the group consisting of a halogen atom (except for a fluorine atom) and —OSO$_2$Rb (Rb represents an alkyl group, fluorine-substituted alkyl group, or aryl group). Z, $R^s$, and $R^h$ are also the same as described above.

The compounds shown below can be exemplified as the specific examples of the nitrogen-containing aromatic compounds expressed by the formula (C').

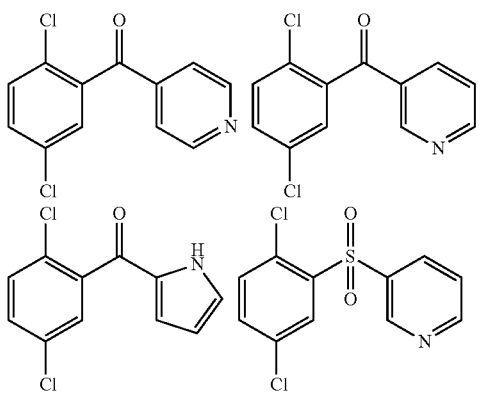

In addition, the compounds substituting chlorine atom with bromine atom and isomers with different bonding sites of chlorine or bromine atom of the compounds described above may also be exemplified. In addition, the compounds substituting a —CO— bond with a —SO$_2$— bond may also be exemplified.

For example, methods such as the following can be exemplified as a method to synthesize the nitrogen-containing aromatic compound described above.

The monomer (C') can be synthesized using some typical synthesis reactions. A method that uses a Friedel-Crafts reaction between a nitrogen-containing heterocycle oxychloride, a dihalogenated benzene or benzoyl chloride, and a nitrogen-containing heterocycle, and a method that uses thioetherification of a halogenated nitrogen-containing heterocycle compound and a thiol through a nucleophilic displacement reaction and oxidation by a peroxide are exemplified.

In the case of using the Friedel-Crafts reaction between a nitrogen-containing heterocycle oxychloride and a dihalogenated benzene, the nitrogen-containing heterocycle oxychloride of the starting substance is used by transforming the corresponding carboxylic acid-substituted nitrogen-containing heterocycle into an oxychloride using thionyl chloride. Even if the oxychloride has turned into a hydrochloride at this stage, the subsequent reaction is not disturbed.

Typical examples are explained below with respect to the production method to use the Friedel-Crafts reaction. Although commonly-used halogenated hydrocarbons can be used as the solvent, the reaction can progress with no solvent in a case where low melting-point compounds such as dichlorobenzene are used and warmed above the melting point.

The reaction is induced by adding a Lewis acid to the solution; however, it is typical and preferable to use aluminum chloride as the Lewis acid. Other Lewis acids such as ferric chloride and zinc chloride are also allowable, but the reaction may be time-consuming since the reactivity is low.

The reaction temperature is selected depending on the species of reaction substances and solvents within the range of 0° C. to 200° C. Excessively high temperatures may decrease the yield due to evaporation or decomposition of the starting substances, etc.

The product after the reaction can be collected by a method using an acid-base interaction since the product has a nitrogen-containing heterocyclic structure. The reaction liquid is poured into acidic water with pH of 1 or less, and excessive Lewis acid is deactivated and dissolved. The nitrogen-containing heterocycle is basic at this stage and, therefore, is dissolved into an aqueous layer when pH is adjusted to 1 or less. The reaction solvent and excessive organic substance can be separated at this stage. The aqueous layer is neutralized with an alkaline and the pH is adjusted to 3 to 4, and then the product is extracted by an organic solvent and the organic layer is separated and concentrated, whereby the intended product can be obtained. When pH is excessively high at this stage, aluminum hydroxide, etc. tends to deposit and the separation is likely to be difficult. In addition, the extracting solvent is not particularly limited as long as separable from water.

Next, a method is explained in detail that uses thioetherification of a halogenated nitrogen-containing heterocycle compound and a thiol through a nucleophilic displacement reaction and oxidation by a peroxide. Initially, a structure having a phenolic thiol group is transformed into a corresponding alkaline metal salt. For this purpose, an alkaline metal such as lithium, sodium and potassium or an alkaline metal compound such as hydrides, hydroxides, and carbonates of alkaline metals is added in a polar solvent with higher dielectric constants. The polar solvent with higher dielectric constants is exemplified by N-methyl-2-pyrrolidone, N,N-dimethyl acetamide, sulfolane, diphenyl sulfone, dimethyl sulfoxide, N,N-dimethyl imidazolidinone, etc. The alkaline metal is usually used in an amount of 1.1 to 2 equivalents, and preferably 1.2 to 1.5 equivalents based on phenolic hydroxyl group.

Subsequently, the alkaline metal salt and the halogenated nitrogen-containing heterocycle undergo a condensation reaction in the co-existence of a water-azeotropic solvent such as benzene, toluene, xylene, hexane, cyclohexane, octane, chlorobenzene, dioxane, tetrahydrofuran, anisole, phenetol, etc. while drawing out the generating water by azeotropy. It is preferred from the viewpoint of reactivity that the halogen is fluorine. In addition, the reaction temperature is in the range of 60° C. to 300° C., and preferably 80° C. to 250° C. The reaction time is in the range of 15 minutes to 100 hours, and preferably 1 to 24 hours.

After the reaction, the product can be collected by a similar process as that of the Friedel-Crafts reaction described above. The collected product is allowed to react with a peroxide active in a polar solvent to generate oxygen, thereby oxidizing the thioether moiety to sulfone. A hydrogen peroxide solution, sodium perborate, etc. can be used as the peroxide. Although the oxidation can be stopped at sulfoxide by adjusting the species of reaction agents, reaction temperature, and reaction time, the oxidation is preferably carried out up to sulfone in order to achieve the effect of the present invention.

Polymerization Reaction

In order to obtain the polymer of the present invention, initially, the monomers (A'), (B') and (C') described above are copolymerized to obtain a precursor. The copolymerization is carried out in the presence of a catalyst, and the catalyst used at this stage is a catalytic system containing a transition metal compound. The catalytic system may contain (1) a transition metal complex (including a copper salt) of a transition metal salt and a coordinating compound (hereinafter referred to as "coordinating component") or a ligand and (2) a reducing agent as essential components, and also a "salt" may be added thereto in order to increase the polymerization rate.

Specific examples of these catalytic components, proportions used of the components, reaction solvent, and polymerization conditions such as concentration, temperature and time may be employed from the compounds and conditions described in Japanese Unexamined Patent Application, First Publication No. 2001-342241.

For example, nickel chloride, nickel bromide, etc. are favorably used as the transition metal salt. In addition, triphenylphosphine, tri-o-tolylphosphine, tri-m-tolylphosphine, tri-p-tolylphosphine, tributylphosphine, tri-tert-butylphosphine, trioctylphosphine, 2,2'-bipyridine, etc. are favorably used as the compound for the ligand. Furthermore, nickel chloride-bis(triphenylphosphine) and nickel chloride-(2,2'-bipyridine) are favorably used as the transition metal (salt) on which the ligand has previously been coordinated. Although iron, zinc, manganese, aluminum, magnesium, sodium, and calcium can be exemplified as the reducing agent, for example, among these, zinc, magnesium, and manganese are preferable. Sodium bromide, sodium iodide, potassium bromide, tetraethylammonium bromide, and tetraethylammonium iodide are preferable as the "salt". A polymerization solvent may be used in the reaction and, more specifically, tetrahydrofuran, N,N-dimethyl formamide, N,N-dimethyl acetamide, 1-methyl-2-pyrrolidone, etc. are favorably used.

For the proportion used of each component in the catalytic system, the transition metal (salt) coordinated with a transition metal salt or ligand is usually 0.0001 to 10 moles per one mol of monomers in total, and preferably 0.01 to 0.5 mol. This range can lead to high catalytic activity, and thus polymers with higher molecular weights can be obtained. When the "salt" is used in the catalytic system, the proportion used is usually 0.001 to 100 moles per one mol of total monomers, and preferably 0.01 to 1 mol. This range can lead to a sufficient effect to increase polymerization velocity. The total concentration of the monomers in the polymerization solvent is usually 1% to 90% by mass, preferably 5% to 40% by mass. In addition, polymerization temperature when polymerizing the polymer of the present invention is usually 0° C. to 200° C., and preferably 50° C. to 100° C. Polymerization time is usually 0.5 to 100 hours, and preferably 1 to 40 hours.

Next, the resulting polymer is hydrolyzed to transform the sulfonic acid ester group (—$SO_3R$) in the structural unit into a sulfonic acid group (—$SO_3H$). The hydrolysis can be achieved by (1) a method in which the polymer having the sulfonic acid ester group is poured into an excessive amount of water or alcohol containing a small amount of hydrochloric acid and stirred for at least 5 minutes, (2) a method in which the polymer having the sulfonic acid ester group in trifluoroacetic acid is allowed to react at about 80° C. to 120° C. for about 5 to 10 hours, (3) a method in which the polymer having the sulfonic acid ester group is allowed to react in a solution containing 1 to 3 moles of lithium bromide per one mol of the sulfonic acid ester group (—$SO_3R$) in the polymer, e.g., N-methylpyrrolidone, at about 80° C. to 150° C. for about 3 to 10 hours, and then hydrochloric acid, etc. is added thereto.

Method B

For example, similarly to the method described in Japanese Unexamined Patent Application, First Publication No. 2001-342241, synthesis is possible by copolymerizing a monomer having a skeleton expressed by the general formula (A') described above and not having a sulfonic acid group or sulfonic acid ester group, the monomer (B') described above, and the monomer (C') described above to produce a polymer, and then the polymer is sulfonated using a sulfonating agent.

Specific examples of the monomer, usable in method B and not having a sulfonic acid group or sulfonic acid ester group capable of forming the structural unit expressed by the general formula (A') described above, are the dihalides described in Japanese Unexamined Patent Application, First Publication Nos. 2001-342241 and 2002-293889.

Method C

In a case where Ar in the general formula (A') is an aromatic group having a substituent expressed by —O($CH_2$)$_n$$SO_3$H or O($CF_2$)$_n$$SO_3$H, similarly to the method described in Japanese Unexamined Patent Application, First Publication No. 2005-60625, synthesis is possible by copolymerizing a precursor monomer capable of forming the structural unit expressed by the general formula (A') described above, a monomer or oligomer capable of forming the structural unit expressed by the general formula (B') described above, and a monomer capable of forming the structural unit expressed by the general formula (C') described above, and then introducing an alkylsulfonic acid or fluorine-substituted alkylsulfonic acid, for example.

The dihalides described in Japanese Unexamined Patent Application, First Publication Nos. 2005-36125 can be exemplified as specific examples of the precursor monomer, usable in method C and capable of forming the structural unit expressed by the general formula (A') described above. More specifically, 2,5-dichloro-4'-hydroxybenzophenone, 2,4-dichloro-4'-hydroxybenzophenone, 2,6-dichloro-4'-hydroxybenzophenone, 2,5-dichloro-2',4'-dihydroxybenzophenone, and 2,4-dichloro-2',4'-dihydroxybenzophenone can be exemplified. In addition, the compounds protecting the hydroxyl group of these compounds by a tetrahydropyranyl group are also exemplified. Moreover, the compounds substituting the hydroxyl group with a thiol group or substituting the chlorine atom with a bromine or iodine atom are also exemplified.

In method C, introduction can be carried out by reacting the hydroxyl group of the precursor polymer with propane sultone, butane sultone, etc. in accordance with the method to introduce an alkyl sulfonic acid group into the precursor polymer (having no sulfonic acid group), for example, the method described in Japanese Unexamined Patent Application, First Publication No. 2005-60625.

Proton Conductive Membrane and Method of Producing the Same

The proton conductive membrane used in the present invention contains the sulfonated polyarylene described above. Preferably, the conductive membrane used in the present invention is obtained by casting a solution, dissolving the sulfonated polyarylene in an organic solvent, on a substrate to prepare a cast membrane, washing the cast film with water to remove any remaining solvent, followed by drying. The membrane thickness of the proton conductive membrane is usually 5 to 200 μm, preferably 10 to 100 μm, and more preferably 10 to 50 μm.

The method to produce the conductive membrane used in the present invention is not particularly limited, and a cast method is mainly employed in which the sulfonated polyarylene polymer is dissolved in an organic solvent, and the solution is casted on a substrate to remove the solvent, followed by drying.

The base material used in such a membrane-forming method is not particularly limited as long as it is used for conventional solution-casting processes. For example, base materials formed of plastics or metals are used, and base materials formed of thermoplastic resin such as polyethylene terephthalate (PET) film are preferably used.

The solvent used in the membrane-forming method is specifically exemplified by aprotic polar solvents such as N-methyl-2-pyrrolidone, N,N-dimethyl formamide, γ-butyrolactone, N,N-dimethyl acetamide, dimethyl sulfoxide, dimethylurea, and dimethylimidazolidinone. Among these, N-methyl-2-pyrrolidone (hereinafter also referred to as "NMP") is particularly preferable from the viewpoint of solubility and viscosity of solutions. The aprotic polar solvents may be used alone or in a combination of two or more.

The mixtures of the aprotic polar solvents and alcohols may be used as the solvent described above. Examples of the alcohol include methanol, ethanol, propyl alcohol, iso-propyl alcohol, sec-butyl alcohol, and tert-butyl alcohol. Among these, methanol is particularly preferable because of the effect to reduce the viscosity of solutions in a wide composition range. The alcohols may be used alone or in a combination of two or more.

In a case where a mixture of the aprotic polar solvents and the alcohols is used, the aprotic polar solvent is 95% to 25% by mass, preferably 90% to 25% by mass, and the alcohol is 5% to 75% by mass, preferably 10% to 75% by mass (note: 100% by mass in total). The amount of the alcohols within the above range may lead to an advantageous effect to reduce the viscosity of solutions.

In addition, inorganic acids such as sulfuric acid and phosphoric acid, organic acids including carboxylic acids, an adequate amount of water, etc. may be used together besides the above alcohols.

The concentration of the polymer in the solution during formation of the membrane is usually 5% to 40% by mass, and preferably 7% to 25% by mass. For a concentration of the polymer less than 5% by mass, it is difficult to thicken the membrane, and pin holes tend to generate. On the other hand, when the concentration of the polymer is above 40% by mass, it is difficult to form a film due to excessively high viscosities and the surface, is likely to lack smoothness.

The viscosity of the solution is usually 2000 to 100000 mPa·s, and preferably 3000 to 50000 mPa·s. For a viscosity of the solution less than 2000 mPa·s, the solution may lack a cohesive property during forming the membrane and may flow out from the base material. On the other hand, when the viscosity of the solution is above 100000 mPa·s, it may be difficult to form a film by a casting method since the solution cannot be extruded from a die due to excessively high viscosity.

When immersing the resulting undried film into water after forming the film as described above, the organic solvent in the undried film can be exchanged with water, and thus the amount of remaining solvent can be reduced in the resulting proton conductive membrane. It should be noted that the undried film may undergo preliminary drying before immersing the undried film into water. The preliminary drying is usually carried out by keeping the undried film at 50° C. to 150° C. for 0.1 to 10 hours.

When the undried film (including preliminarily dried film, same in the following) is immersed into water, a batch system is allowable in which cut films are immersed into water, and also a continuous system is allowable in which a laminate film itself in a condition formed on a substrate film (e.g., PET) or a membrane separated from a substrate is immersed into water and then rolled up. In the case of the batch system, it is preferable for the undried film to be immersed into water by way of framing the undried film, etc. in order to prevent wrinkles from forming on the surface of treated film.

The amount of water, used at immersing the undried film into water, is no less than 10 parts by mass based on 1 part by mass of the undried film, preferably no less than 30 parts by mass, and more preferably no less than 50 parts by mass. When the amount of water used is in the range described above, the amount of solvent remaining can be reduced in the resulting proton conductive membrane. It is also effective to always maintain the concentration of organic solvent below a certain concentration in water by exchanging or overflowing the water in use for immersion in order to reduce the amount of solvent remaining in the resulting proton conductive membrane. Furthermore, it is effective to homogenize the concentration of organic solvent in water by stirring, etc. in order to reduce in-plane distribution of the amount of organic solvent remaining in the proton conductive membrane.

The temperature of water when immersing the undried film into water is usually 5° C. to 80° C., and preferably 10° C. to 60° C. in view of exchanging rate and easy handling. The higher the temperature is, the higher the exchanging rate is between the organic solvent and water; however, since the amount of water absorbed by the film becomes larger, the surface condition of the resulting proton conductive membrane after drying may degrade. In addition, the immersion time of the film, which depends on the initial amount of remaining solvent, the amount of water in use, and treating temperature, is usually 10 minutes to 240 hours, and preferably 30 minutes to 100 hours.

After immersing the undried film into water as described above, the film is dried at 30° C. to 100° C., and preferably 50° C. to 80° C., for 10 to 180 minutes and preferably 15 to 60 minutes, and then vacuum-dried at 50° C. to 150° C., and preferably under a reduced pressure of 500 mmHg to 0.1 mmHg for 0.5 to 24 hours, whereby the proton conductive membrane is obtained.

The amount of solvent remaining in the resulting proton conductive membrane as described above can be reduced usually to no greater than 5% by mass, and preferably to no greater than 1% by mass.

It should be noted that the thickness of dried membrane of the proton conductive membrane obtained by the method of the present invention is usually 10 to 100 μm, and preferably 20 to 80 μm.

Electrode

The electrode of the membrane-electrode assembly of the present invention for a solid polymer electrolyte fuel cell consists of an electrode catalyst formed of a catalytic metal particle or a conductive carrier carrying a catalytic metal particle and an electrode electrolyte, and may contain other components such as carbon fiber, a dispersant and water repellent agent as required.

As for the catalytic metal particle, which is not particularly limited as long as it contains catalytic activity, metal black can be used that is formed of noble metal fine particle itself such as platinum black. Although the conductive carrier to carry the catalytic metal particle is not particularly limited as long as it has adequate conductivity and corrosion resistance, those containing carbon as a main component are desirable due to having a specific surface sufficient to highly disperse the catalytic metal particle and sufficient electron conductivity. The catalyst carrier that configures the electrode should carry the catalytic metal particle as well as perform as an electron collector to retrieve electrons to an external circuit or gather from an external circuit. When the electric resistivity is high, the internal resistance of cells comes to higher and, consequently, the performance of the cells degrade. Therefore, the electron conductivity of the catalyst carrier contained in the electrode should be sufficiently high. That is, those having sufficient electron conductivity as an electrode catalyst carrier are available, and carbon materials with developed fine pores are suitably used. Carbon black, activated carbon, etc. are preferably used as the carbon material with developed fine pores. The carbon black is exemplified by channel black, furnace black, thermal black, acetylene black, etc. The activated carbon is obtained by carbonizing and treating thereof to activate various carbon atom-containing materials. In addition, metal oxides, metal carbides, metal nitrides, or polymer compounds having electron conductivity may also be included. It should be noted that the term "main component" herein indicates to contain a carbonaceous substance by no less than 60% by mass.

In addition, although platinum or platinum alloys are used as the catalytic metal particle to be carried on the conductive carrier, when platinum alloys are used, stability, activity, etc. can be additionally provided as the electron catalyst. Preferably, the platinum alloy is an alloy of at least one selected from the group consisting of platinum group metals such as ruthenium, rhodium, palladium, osmium and iridium; cobalt, iron, titanium, gold, silver, chromium, manganese, molybdenum, tungsten, aluminum, silicon, rhenium, zinc, and tin and platinum; an intermetallic compound formed between platinum and an alloyed metal may be included in the platinum alloy.

The loading rate of platinum or platinum alloy (rate by mass of platinum or platinum alloy based on the total mass of the catalyst loaded) is 20% to 80% by mass, and particularly preferably 30% to 55% by mass. This range may lead to higher output. A loading rate of no less than 20% by mass can lead to sufficient output, and a loading rate of no greater than 80% by mass can support the particle of platinum or platinum alloy with satisfactory dispersibility on carbon materials of the carrier.

It is also preferred that the primary particle diameter of platinum or platinum alloy is 1 to 20 nm in order to obtain a highly active gas-diffusion electrode and in particular 2 to 5 nm in order to assure a large surface area of platinum or platinum alloy for the reaction activity thereof.

An ion conductive polymer electrolyte (ion conductive binder) having a sulfonic acid group is preferably used as the electrode electrolyte. Usually, the carried catalyst is coated with the electrolyte, and protons ($H^+$) travel through the electrolyte-connecting pathway.

Perfluorocarbon polymers, represented by Nafion (registered trade name), Flemion (registered trade name), and Aciplex (registered trade name), are preferably used as the ion conductive polymer electrolyte having a sulfonic acid group. Polymers prepared by introducing a sulfonic acid group or phosphoric acid group into heat resistant polymers such as sulfonated products of a vinyl monomer like polystyrene sulfonic acid, polybenzimidazole and polyether ether ketone, or ion conductive polymer electrolytes mainly containing an aromatic hydrocarbon compound such as sulfonated polyarylene described herein may be used in addition to the perfluorocarbon polymers.

It is also preferred that the ion conductive binder is contained at a proportion of 0.1 to 3.0 by mass ratio per the catalyst particle, and particularly preferably at a proportion of 0.3 to 2.0. When the rate of the ion conductive binder is at least 0.1, protons can be transmitted to the electrolyte membrane to obtain a sufficient output, and when the rate is no greater than 3.0, gas can reach the platinum to obtain sufficient output since the ion conductive binder does not completely coat the catalyst particles.

Rayon carbon fiber, PAN carbon fiber, lignin-poval carbon fiber, pitch carbon fiber, vapor-grown carbon fiber, etc. can be used as the optionally added carbon fiber; among these, the vapor-grown carbon fiber is preferable. When carbon fiber is included, due to the volume of fine pores increasing, dispersibility of fuel gas and/or oxygen gas is enhanced and also flooding of forming water can be improved, resulting in higher power generation performance. It should be noted that carbon fiber may be included into either one or both of the anode and cathode sides of the electrode catalyst layer.

The dispersant may be exemplified by anion surfactants, cation surfactants, ampholytic surfactants, nonionic surfactants, etc. The dispersant may be used alone or in a combination of two or more. Among these, preferable are surfactants having a basic group, more preferable are the anion or cation surfactants, and still more preferable are surfactants having a molecular weight of 5000 to 30000. When the dispersants are added to a paste composition for electrodes used during formation of the electrode catalyst layer, productivity during coating is improved due to excellent storage stability and flowability.

The membrane-electrode assembly of the present invention may consist only of an anodic catalyst layer, a proton conductive membrane, and a cathodic catalyst layer; more preferably, a gas diffusion layer formed of a conductive porous substrate such as carbon paper and carbon cloth is disposed outside the catalyst layer together with the anode and cathode. Since the gas diffusion layer also performs as an electron collector, the electrode in the present description refers to the combination of the gas diffusion layer and the catalyst layer in cases where the gas diffusion layer is provided.

In a polymer electrolyte fuel cell having the membrane-electrode assembly of the present invention, oxygen-containing gas is supplied to the cathode and hydrogen-containing gas is supplied to the anode. More specifically, for example, separators on which grooves, which are gas pathway, are formed are disposed outside both of the electrodes with the membrane-electrode assembly, and a gas is allowed to flow in the gas pathway, thereby supplying a gas that is fuel to the membrane-electrode assembly.

As for the method to produce the membrane-electrode assembly of the present invention, various methods can be employed such as a method in which a catalyst layer is directly formed on a proton conductive membrane and sandwiched by gas diffusion layers as required, a method in which a catalyst layer is formed on a substrate for a gas diffusion layer of carbon paper, etc. and connected with an ion-exchange membrane, and a method in which a catalyst layer is formed on a flat plate and transferred to a proton conductive membrane, then the flat plate is peeled, and further is sandwiched by gas diffusion layers as required.

As for the method to form the catalyst layer, a publicly known method can be employed in which the catalyst layer is formed on a proton conductive membrane, a gas diffusion layer, or a flat plate using a dispersion liquid where a carried catalyst and a perfluoro carbon polymer having a sulfonic acid group are dispersed into a medium (water repellent agents, pore-generating agents, thickening agents, diluent solvents, etc. are added as required).

The method to form the electrode paste composition is exemplified by brush coating, nap-pen coating, bar coater coating, knife coater coating, doctor blade coating, screen printing, spray coating, etc.

When no catalyst layer is formed directly on the proton conductive membrane, it is preferred that the catalyst layer and the proton conductive membrane are connected by a hot press process, an adhesion process (see Japanese Unexamined Patent Application, First Publication Hei No. 07-220741), etc.

EXAMPLES

The present invention is further explained in more detail with reference to examples; however, the present invention is not to be limited to the examples. It should be noted that various measured values in the examples were obtained by performing the following procedures.

Evaluation of Sulfonated Polymer

With respect to the sulfonated polymers obtained in Examples 1 to 4 and Comparative Examples 1 to 4 described below, cast membranes were prepared by the procedures described below and various properties were evaluated. The evaluation results of sulfonic acid equivalent and proton conductivity are shown in Table 1 and the results of heat resistance and chemical durability are shown in Table 2.

Sulfonic Acid Equivalent

The resulting sulfonated polymer was washed with 1 N HCl aqueous solution, then sufficiently washed with ion-exchanged water till the washing water came to neutral so as to remove remaining free acid. After washing and drying, a predetermined amount was weighed and titrated using a NaOH reference solution and an indicator of phenolphthalein dissolved in a combined solvent of THF/water, and the sulfonic acid equivalent was determined from the point of neutralization.

Measurement of Molecular Weight

Molecular weight of sulfonated polymers or molecular weight of sulfonated polymers after heat resistance test was determined based on a polystyrene standard by means of GPC using a mixed solution of 7.83 g of lithium bromide, 3.3 mL of phosphoric acid, and 2 L of N-methyl-2-pyrrolidone (NMP) as an eluting solution.

Measurement of Proton Conductivity

A proton conductive membrane was cut out into a strip shape 5 mm wide to prepare a measurement sample, and an alternating-current resistance was determined from the measurement of AC impedance between platinum wires in a way that platinum wires (Φ=0.5 mm) were pushed onto the surface of the membrane sample and the sample was held in a constant temperature and humidity apparatus. That is, impedance at AC 10 kHz was measured under the conditions of 85° C. and relative humidity of 90% and 50%. A chemical impedance measuring system (manufactured by NF Corporation) was used as the resistance measurement system and JW241 (manufactured by Yamato Scientific Co.) was used as the constant temperature and humidity apparatus. Five platinum wires were held thereto with spacing of 5 mm, and AC resistance was measured while changing the wire spacing from 5 mm to 20 mm. Specific resistance R of the membrane was calculated from the wire spacing and the resistance gradient (see mathematical formula (1)), AC impedance was calculated from the inverse of specific resistance R, and proton conductivity was calculated from the impedance.

Specific resistance, $R(\Omega \cdot cm) = 0.5$ (cm)×membrane thickness(cm)×resistance wire gradient ($\Omega$/cm)   mathematical formula (1)

Evaluation of Heat Resistance

Each film of about 40 μm thick was placed in an oven at 160° C. for 24 hours. Samples before and after the heat resistance test were collected in an amount corresponding to 0.2 part by mass versus 99.8 parts by mass of the GPC eluting solution of NMP, immersed and dissolved, and then insoluble matter was removed to perform GPC measurement. The content of insoluble matter was determined from the ratio of elution peak areas in the GPC chart before and after the heat resistance test.

Evaluation of Chemical Durability

A hydrogen peroxide solution of 5% by mass after quantifying the concentration was poured into an outer cell of double cells made of pressure-resistant glass, and samples of various sulfonated polymer membranes conditioned at 25° C. and 50% $R^h$ for at least 8 hours were cut to be 2 cm by 3 cm and weighed, and then inserted into an inner cell, followed by sealing thereof. The cell was heated at 85° C. for 24 hours using an oven, and the membrane samples were exposed to hydrogen peroxide vapor, and then the cell was removed and allowed to cool. The removed samples were rinsed with ion-exchange water and weighed after conditioning at 25° C. and 50% $R^h$ for at least 8 hours, and then the weight change was determined between before and after the test. In addition, the molecular weight of the samples before and after the test was measured by way of GPC, and the change rate of molecular weight was determined.

Synthesis Example 1

Synthesis of 3 (2,5-dichlorobenzoyl)pyridine

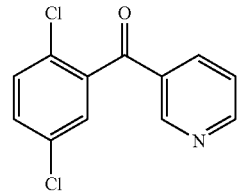

183.8 g (1.25 mol) of 1,4-dichlorobenzene was weighed and then dissolved in a 1 L three-necked flask equipped with a stirrer, thermometer, cooling pipe, and nitrogen inlet tube by heating at 60° C. under a nitrogen atmosphere using an oil bath. Thereafter, 160.1 g (1.20 mol) of aluminum chloride was added, and 89.0 g (0.5 mol) of nicotinic acid chloride hydrochloride was added in small amounts under stirring over one hour. After completing the addition, internal temperature was raised to 90° C. to 100° C. and allowed to react. After confirming the disappearance of raw materials by way of thin-layer chromatography, the reaction liquid was allowed to cool to 70° C., and then 150 mL of MIBK (methyl isobutyl ketone) was added to dilute. After allowing the solution to cool to room temperature, the reaction liquid was gradually added to 1 L of 2 N HCl, the product was extracted into an acidic water, and then the liquid of organic layer was separated to remove excessive 1,4-dichlorobenzene. A sodium hydroxide solution of 4 mol/L was gradually added till the pH of the aqueous layer became 3 to 4, and the product was extracted with MIBK. The organic layer was washed using water and a sodium chloride solution, the organic layer was dried using magnesium sulfate, and then the solvent was removed by an evaporator. The approximate yield amount was 130 g. The course product was purified by means of column chromatography using a solvent of hexane/ethyl acetate as a developing solvent, whereby the intended product was obtained as a viscous liquid in an amount of 110 g and at a yield of 87%. A $^1$H-NMR spectrum of the resulting compound is shown in FIG. 1.

Synthesis Example 2

Synthesis of 4-(2,5-dichlorobenzoyl)pyridine

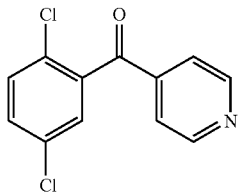

Figure 2:
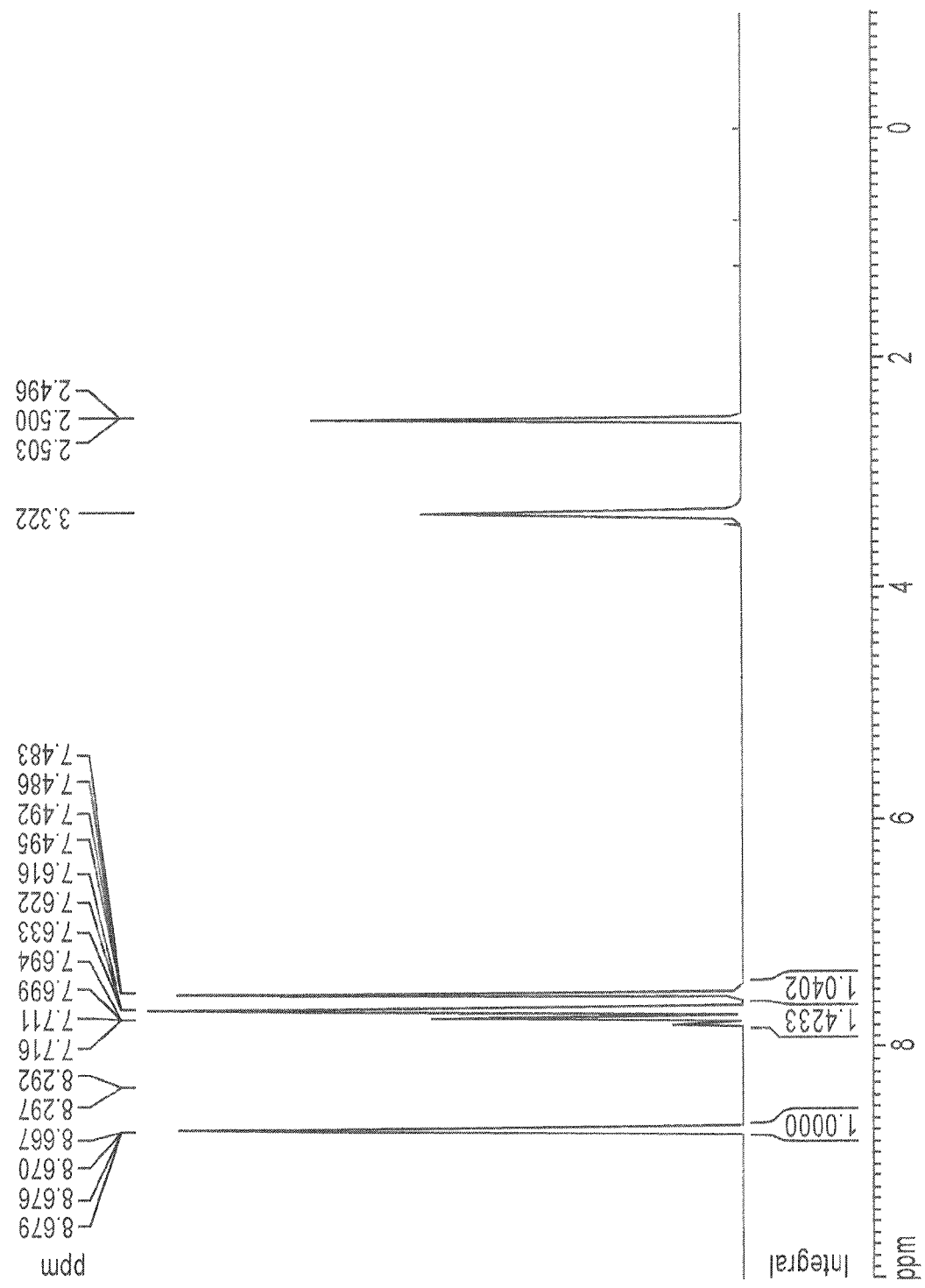
FIG. 2 is a $^1$H-NMR spectrum of the compound obtained in Synthesis Example 2.

A crude product was obtained in an amount of 130 g in a similar manner as Synthesis Example 1 except that isonicotinic acid chloride hydrochloride was used as a substitute for 89.0 g (0.5 mol) of nicotinic acid chloride hydrochloride. It was recrystallized from butanol to obtain the intended product in an amount of 100.5 g and at a yield of 79% as a white solid. A $^1$H-NMR spectrum of the resulting compound is shown in FIG. 2.

Synthesis Example 3

Synthesis of 2-(2,5-dichlorobenzoyl)pyrrole

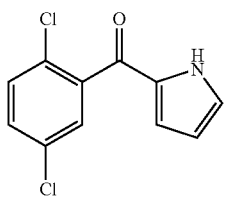

200 mL of dichloromethane was poured into a 1 L three-necked flask equipped with a stirrer, thermometer, dropping funnel, and nitrogen inlet tube, cooled to 0° C. using a salt-ice bath, and then 80.4 g (0.6 mol) of aluminum chloride and 40.3 g (0.6 mol) of pyrrole were added. Next, 104.7 g (0.50 mol) of 2,5-dichlorobenzoyl chloride dissolved in 100 mL of dichloromethane was slowly added dropwise using a dropping funnel. After completing the addition, the reactant was stirred for 3 hours while maintained at 5° C. to 10° C. using the salt-ice bath. After confirming the disappearance of raw materials by way of thin-layer chromatography, the reaction liquid was gradually added to 1 L of 2 N HCl, and excessive aluminum chloride was dissolved and removed. The organic layer was washed using 5% sodium bicarbonate water, water, and a sodium chloride solution, and the organic layer was dried using magnesium sulfate, and then the solvent was removed by an evaporator. The approximate yield amount was 120 g. The crude product was recrystallized from hexane/ethyl acetate to obtain the intended product in an amount of 95 g and at a yield of 79% as a milky white solid.

Synthesis Example 4

Synthesis of 3-(2,5-dichlorobenzenesulfonyl)pyridine

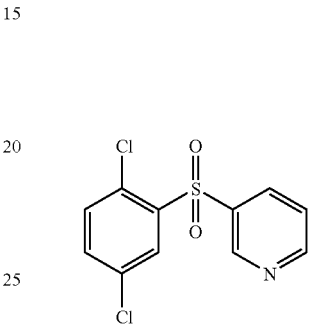

89.5 g (0.500 mol) of 2,5-dichlorobenzenethiol, 53.4 g (0.55 mol) of 3-fluoropyridine, 82.9 g (0.60 mol) of potassium carbonate, and 550 mL of anhydrous N,N'-dimethyl acetamide were weighed in a 2 L three-necked flask equipped with a stirrer, thermometer, cooling pipe, and nitrogen inlet tube. The reaction solution was heated to 100° C. for 3 hours under a nitrogen atmosphere using an oil bath. After confirming the disappearance of raw materials by way of thin-layer chromatography, the reaction liquid was allowed to cool to room temperature. Thereafter, the reaction liquid was gradually added to 3 L of water, and the product was solidified and filtered. The product obtained by filtering was dissolved in 2.5 L of toluene, and then washed with a sodium chloride solution using a separating funnel till the aqueous layer became neutral. The organic layer was dried using magnesium sulfate, and then the solvent was removed by an evaporator to obtain 2,5-dichlorophenyl pyridyl sulfide of an intermediate in an approximate yield amount of 129 g.

129 g of the crude product of the intermediate, 461.6 g (3.0 mol) of sodium perborate tetrahydrate, and 500 mL of acetic acid were weighed in a 2 L three-necked flask equipped with a stirrer, thermometer, cooling pipe, and nitrogen inlet tube. The reaction solution was heated to 60° C. for 5 hours under a nitrogen atmosphere using an oil bath. After confirming the disappearance of raw materials by way of thin-layer chromatography, acetic acid was removed and the reactant was dissolved by adding ethyl acetate. The organic layer was washed using 5% sodium bicarbonate water, water, and a sodium chloride solution, and the organic layer was dried using magnesium sulfate, and then the solvent was removed by an evaporator to obtain a crude product in an amount of 130 g.

The crude product was recrystallized from ethanol to obtain 115 g of a white solid at a yield of 80%.

Synthesis Example 5

Synthesis of
2,5-dichloro-4'-(1-imidazolyl)benzophenone
(comparative synthesis example)

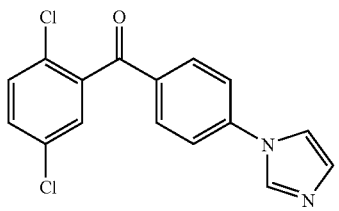

150.7 g (0.560 mol) of 2,5-dichloro-4'-fluorobenzophenone, 114.4 g (1.68 mol) of imidazole, 100.6 g (0.728 mol) of potassium carbonate, and 840 mL of N,N-dimethyl acetamide were weighed in a 2 L three-necked flask equipped with a stirrer, thermometer, cooling pipe, and nitrogen inlet tube. The reaction solution was heated to 110° C. using an oil bath for 2 hours under a nitrogen atmosphere. After confirming the disappearance of raw materials by way of thin-layer chromatography, the reaction liquid was allowed to cool to room temperature. Thereafter, the reaction liquid was gradually added to 3 L of water, the product was solidified and filtered. The product obtained by filtering was dissolved in THF (1.2 L), toluene (4 L) was added, and the mixture was washed with a sodium chloride solution till the aqueous layer became neutral. The organic layer was dried using magnesium sulfate, and then the solvent was removed by an evaporator. The approximate yield amount was 180 g. The crude product was subjected to a recrystallization separating operation using a mixed solvent of 1 L toluene and 20 mL methanol heated at 80° C. to obtain 155 g of a white solid at a yield of 87%.

Synthesis Example 6

Synthesis of 3-(2,5-dichlorobenzoyl)benzenesulfonic
Acid Neopentyl Which is a Monomer Having a
Sulfonic Acid

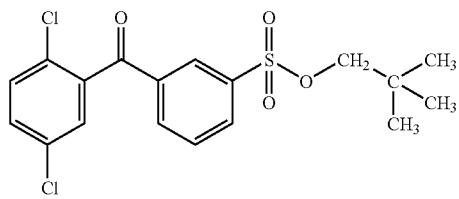

Chlorosulfonic acid (233.0 g, 2 mol) was added into a 3 L three-necked flask equipped with a stirrer and cooling pipe, followed by adding 2,5-dichlorobenzophenone (100.4 g, 400 mmol), and the reactant was allowed to react for 8 hours using an oil bath at 100° C. After a predetermined time, the reaction liquid was slowly poured into crushed ice (1000 g) and extracted with ethyl acetate. The organic layer was washed with sodium chloride solution and dried with magnesium sulfate, and then ethyl acetate was removed to obtain a light yellow crude crystal (3-(2,5-dichlorobenzoyl)benzenesulfonic acid chloride. The crude crystal was not purified and directly used in the following step.

2,2-Dimethyl-1-propanol(neopentyl alcohol) (38.8 g, 440 mmol) was added to 300 mL of pyridine, and the mixture was cooled to about 10° C. The crude crystal obtained, as described above, was gradually added to the mixture over about 30 minutes. After adding the total amount, the reactant was further stirred for 30 minutes and allowed to react. After the reaction, the reaction liquid was poured into 1000 mL of an aqueous HCl solution, and the precipitated solid was collected. The resulting solid was dissolved in ethyl acetate, washed with a sodium hydrogen carbonate aqueous solution and a sodium chloride solution, dried with magnesium sulfate, and then ethyl acetate was removed to obtain a crude crystal. The crude crystal was recrystallized to obtain a white crystal of the intended product of 3-(2,5-dichlorobenzoyl)benzenesulfonic acid neopentyl.

Synthesis Example 7

Synthesis 1 of a Compound Corresponding to a
Hydrophobic Unit 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed in a 1 L three-necked flask equipped with a stirrer, thermometer, cooling pipe, Dean-Stark tube, and nitrogen-introduction three-way stop cock. After nitrogen substitution, 346 mL of sulfolane and 173 mL of toluene were added, and the mixture was stirred. The flask was immersed into an oil bath, and the reactant was heated to reflux at 150° C. When the reaction proceeded while the water generated through the reaction was subjected to azeotropy with toluene and removed outside through a Dean-Stark tube, almost no generation of water was noticed for 3 hours. After a majority of the toluene was removed while gradually raising the reaction temperature, the reaction was continued at 200° C. for 3 hours. Next, 12.3 g (0.072 mol) of 2,6-dichlorobenzonitrile was added thereto, and further reacted for 5 hours.

The resulting reaction liquid was allowed to cool, and then diluted by adding 100 mL of toluene. A precipitate of by-produced inorganic compounds was removed by filtration, and the filtrate was poured into 2 L of methanol. The precipitated product was separated by filtration, and collected and dried, then dissolved in 250 mL of tetrahydrofuran. The product was precipitated again in 2 L of methanol to obtain 107 g of the intended compound.

The number average molecular weight of the resulting intended compound was 7300 based on polystyrene standard by way of GPC (THF solvent). The resulting compound was an oligomer expressed by the structural formula below.

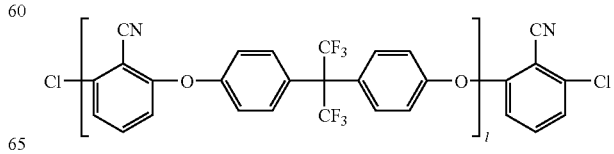

Synthesis Example 8

Synthesis 2 of a Compound Corresponding to a Hydrophobic Unit 67.3 g (0.20 mol) of 2,2-bis(4-hydroxyphenyl)-1,1,1,3,3-hexafluoropropane, 60.3 g (0.24 mol) of 4,4'-dichlorobenzophenone (4,4'-DCBP), 71.9 g (0.52 mol) of potassium carbonate, 300 mL of N,N-dimethyl acetamide (DMAc), and 150 mL of toluene were weighed in a 1 L three-necked flask equipped with a stirrer, thermometer, cooling pipe, Dean-Stark tube, and nitrogen-introduction three-way stop cock, and heated under a nitrogen atmosphere in an oil bath at 130° C. while stirring to allow for reaction. When the reaction proceeded while the water generated through the reaction was subjected to azeotropy with toluene and removed outside through a Dean-Stark tube, almost no generation of water was noticed for 3 hours. The reaction temperature was gradually raised from 130° C. to 150° C. After a majority of the toluene was removed while gradually raising the reaction temperature to 150° C., the reaction was continued at 150° C. for 10 hours, and then 10.0 g (0.040 mol) of 4,4'-DCBP was added further reacted for 5 hours. After the resulting reaction liquid was allowed to cool, a precipitate of by-produced inorganic compounds was removed by filtration, and the filtrate was poured into 4 L of methanol. The precipitated product was separated by filtration, and collected and dried, then dissolved in 300 mL of tetrahydrofuran. The product was precipitated again in 4 L of methanol to obtain 95 g (yield: 85%) of the intended compound.

The number average molecular weight of the resulting polymer was 11200 based on a polystyrene standard by way of GPC (THF solvent). The resulting compound was an oligomer expressed by the structural formula below.

potassium carbonate was changed to 58.0 g (0.42 mol). As a result, the intended compound was obtained by 120 g at a yield of 96%. The number average molecular weight of the resulting intended compound was 7600 based on a polystyrene standard by way of GPC (THF solvent). The resulting compound was an oligomer expressed by the structural formula below.

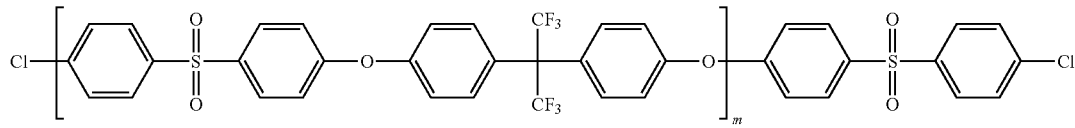

Example 1

Nitrogen-Containing Heterocyclic Group-Containing Sulfonated Polymer P1A 166 mL of dry N,N-dimethyl acetamide (DMAc) was added to the mixture of 37.6 g (93.7 mmol) of 3-(2,5-dichlorobenzoyl)benzenesulfonic acid neopentyl synthesized in Synthesis Example 6, 13.4 g (1.8 mmol) of the compound synthesized in Synthesis Example 7, 1.18 g (4.7 mmol) of 3-(2,5-dichlorobenzoyl)pyridine obtained in Synthesis Example 1, 2.62 g (4.0 mmol) of bis(triphenylphosphine) nickel dichloride, 10.5 g (40.1 mmol) of triphenylphosphine, 0.45 g (3.0 mmol) of sodium iodide, and 15.7 g (240.5 mmol) of zinc under a nitrogen atmosphere in a 1 L three-necked flask connected with a stirrer, thermometer, and nitrogen inlet tube.

The reactant was heated under stirring (finally warmed to 82° C.), and allowed to react for 3 hours. Viscosity build-up of the reactant was observed during the reaction. The polymerization reaction solution was diluted with 175 mL of DMAc and stirred for 30 minutes, and the solution was filtered using sellite as a filtering aid. 24.4 g (281 mmol) of lithium bromide was added to the filtrate in thirds three times at an interval of 1 hour in a 1 L three-necked flask connected with a stirrer, and the mixture was allowed to react at 120° C. of inner temperature for 5 hours under a nitrogen atmosphere. After the reaction, the reactant was cooled to room temperature, and poured into 4 L of acetone to solidify. The coagulation was collected by filtration and air-dried, then pulverized by a mixer and washed in 1500 mL of 1N sulfuric acid. After filtering, the product was washed with ion-exchange water till the pH of the washing liquid became at least 5, and then dried overnight at 80° C., whereby 38.0 g of the intended sulfonated polymer was obtained. The molecular weight of the sulfonated polymer after deprotection was Mn=63000 and Mw=194000. The ion-exchange capacity of the polymer was 2.30 meq/g. The resulting polymer having a sulfonic acid group was a compound expressed by the structural formula below (polymer P1A).

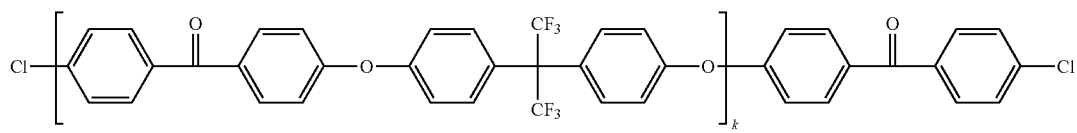

Synthesis Example 9

Synthesis 3 of a Compound Corresponding to a Hydrophobic Unit

Polymerization was carried out in a similar manner as Synthesis Example 8 described above, except that bis(4-chlorophenyl)sulfone (BCPS) was used in place of 4,4'-dichlorobenzophenone (4,4'-DCBP) and the initial feed amount was set to 53.5 g (0.214 mol) and the subsequently added feed amount was set to 3.3 g (0.0133 mol), and the amount used of

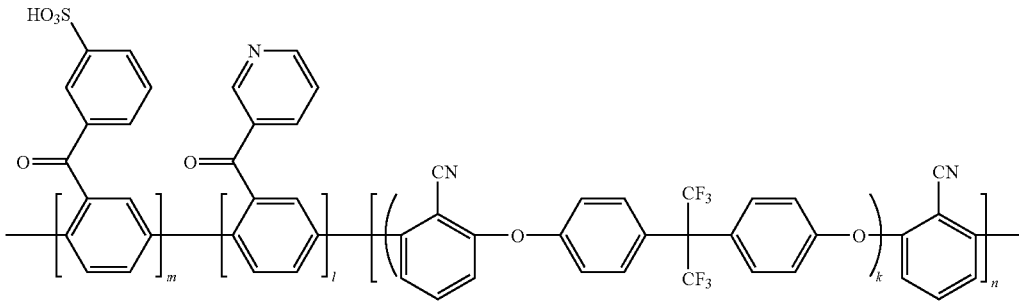

A membrane was formed by a casting process from a solution dissolving the resulting polymer P1A in a mixed solvent of methanol/NMP=50/50 in a concentration of 13% to 17% by mass. The membrane was immersed overnight in a large amount of distilled water, and the residual NMP in the membrane was removed by action of dilution, then the membrane was dried to obtain a proton conductive membrane. The thickness of the membrane was 40 μm.

Example 2

Nitrogen-Containing Heterocyclic Group-Containing Sulfonated Polymer P2B

In a similar manner to Example 1, 37.5 g of the intended sulfonated polymer was obtained except that the monomers used to synthesize the copolymer of the sulfonic acid derivative protected by a neopentyl group were changed to 37.8 g (94.3 mmol) of 3-(2,5-dichlorobenzoyl)benzenesulfonic acid neopentyl synthesized in Synthesis Example 6, 13.4 g (1.2 mmol) of the compound synthesized in Synthesis Example 8, and 1.19 g (4.7 mmol) of 4-(2,5-dichlorobenzoyl)pyridine obtained in Synthesis Example 2. The molecular weight of the sulfonated polymer after deprotection was Mn=62000 and Mw=184000. The ion-exchange capacity of the polymer was 2.30 meq/g. The resulting polymer having a sulfonic acid group was a compound expressed by the structural formula below (polymer P2B). A proton conductive membrane was also prepared in a similar manner to Example 1, except that the polymer P2B was used in place of the polymer P1A.

Example 3

Nitrogen-Containing Heterocyclic Group-Containing Sulfonated Polymer P3A

In a similar manner to Example 1, 36.5 g of the intended sulfonated polymer was obtained except that the monomers used to synthesize the copolymer of the sulfonic acid derivative protected by a neopentyl group were changed to 37.6 g (93.7 mmol) of 3-(2,5-dichlorobenzoyl)benzenesulfonic acid neopentyl synthesized in Synthesis Example 6, 13.4 g (1.8 mmol) of the compound synthesized in Synthesis Example 7, and 1.13 g (4.7 mmol) of 2-(2,5-dichlorobenzoyl)pyrrole obtained in Synthesis Example 3. The molecular weight of the sulfonated polymer after deprotection was Mn=58000 and Mw=192000. The ion-exchange capacity of the polymer was 2.32 meq/g. The resulting polymer having a sulfonic acid group was a compound expressed by the structural formula below (polymer P3A). A proton conductive membrane was also prepared in a similar manner as Example 1, except that the polymer P3A was used in place of the polymer P1A.

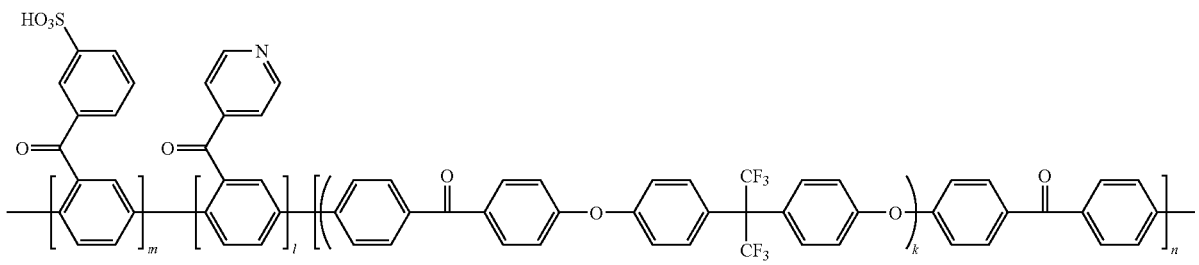

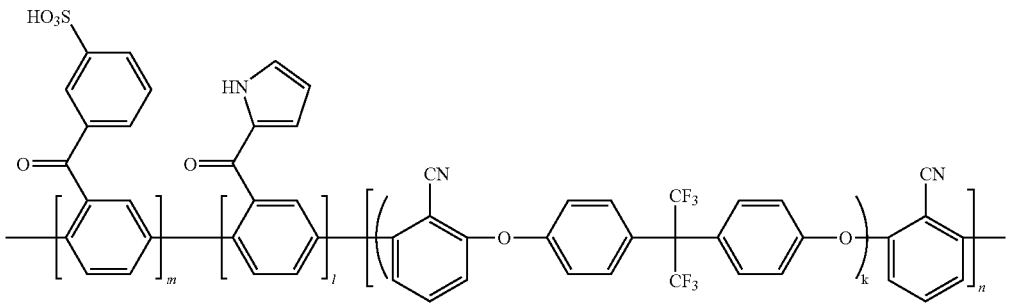

Example 4                             Comparative Example 1

Nitrogen-Containing Heterocyclic Group-Containing Sulfonated Polymer P4C

In a similar manner to Example 1, 38.0 g of the intended sulfonated polymer was obtained except that the monomers used to synthesize the copolymer of the sulfonic acid derivative protected by a neopentyl group were changed to 37.6 g (93.8 mmol) of 3-(2,5-dichlorobenzoyl)benzenesulfonic acid neopentyl synthesized in Synthesis Example 6, 13.1 g (1.7 mmol) of the compound synthesized in Synthesis Example 9, and 1.35 g (4.7 mmol) of 3-(2,5-dichlorobenzenesulfonyl)pyridine obtained in Synthesis Example 4. The molecular weight of the sulfonated polymer after deprotection was Mn=55000 and Mw=182000. The ion-exchange capacity of the polymer was 2.32 meq/g. The resulting polymer having a sulfonic acid group was a compound expressed by the structural formula below (polymer P4C). A proton conductive membrane was also prepared in a similar manner as Example 1, except that the polymer P4C was used in place of the polymer P1A.

Nitrogen-Containing Heterocyclic Group-Containing Sulfonated Polymer P6C

In a similar manner to Example 1, 36.0 g of the intended sulfonated polymer was obtained except that the monomers used to synthesize the copolymer of the sulfonic acid derivative protected by a neopentyl group were changed to 37.6 g (93.7 mmol) of 3-(2,5-dichlorobenzoyl)benzenesulfonic acid neopentyl synthesized in Synthesis Example 6, 13.1 g (1.7 mmol) of the compound synthesized in Synthesis Example 9, and 1.49 g (4.7 mmol) of 2,5-dichloro-4'-(1-imidazolyl)benzophenone obtained in Synthesis Example 5. The molecular weight of the sulfonated polymer after deprotection was Mn=63000 and Mw=202000. Ion-exchange capacity of the polymer was 2.23 meq/g. The resulting polymer having a sulfonic acid group was a compound expressed by the structural formula below (polymer P6C). A proton conductive membrane was also prepared in a similar manner as Example 1, except that the polymer P6C was used in place of the polymer P1A.

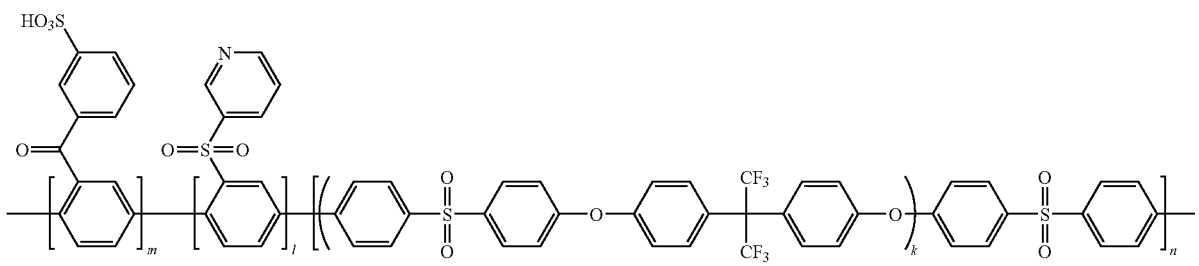

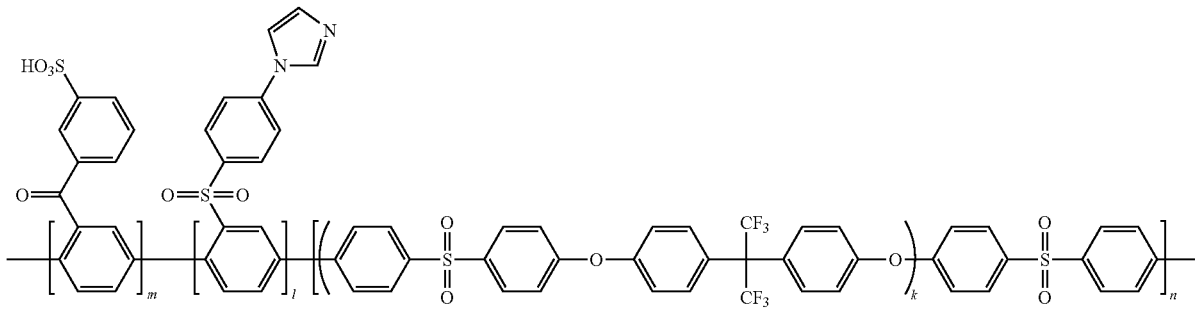

Comparative Example 2

Sulfonated Polymer PA

In a similar manner to Example 1, 40.0 g of the intended sulfonated polymer was obtained except that the monomers used to synthesize the copolymer of the sulfonic acid derivative protected by a neopentyl group were changed to 39.4 g (98.2 mmol) of 3-(2,5-dichlorobenzoyl)benzenesulfonic acid neopentyl synthesized in Synthesis Example 6 and 15.0 g (2.1 mmol) of the compound synthesized in Synthesis Example 7. The molecular weight of the sulfonated polymer after deprotection was Mn=54000 and Mw=188000. The ion-exchange capacity of the polymer was 2.31 meq/g. The resulting polymer having a sulfonic acid group was a compound expressed by the structural formula below (polymer PA). A proton conductive membrane was also prepared in a similar manner to Example 1, except that the polymer PA was used in place of the polymer P1A.

Comparative Example 3

Sulfonated Polymer PB

In a similar manner to Example 1, 41.2 g of the intended sulfonated polymer was obtained except that the monomers used to synthesize the copolymer of the sulfonic acid derivative protected by a neopentyl group were changed to 39.7 g (98.9 mmol) of 3-(2,5-dichlorobenzoyl)benzenesulfonic acid neopentyl synthesized in Synthesis Example 6 and 15.2 g (1.4 mmol) of the compound synthesized in Synthesis Example 8. The molecular weight of the sulfonated polymer after deprotection was Mn=62000 and Mw=200000. The ion-exchange capacity of the polymer was 2.30 meq/g. The resulting polymer having a sulfonic acid group was a compound expressed by the structural formula below (polymer PB). A proton conductive membrane was also prepared in a similar manner as Example 1, except that the polymer PB was used in place of the polymer P1A.

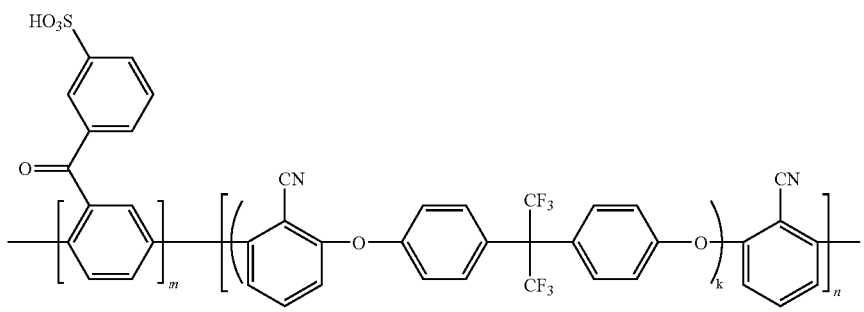

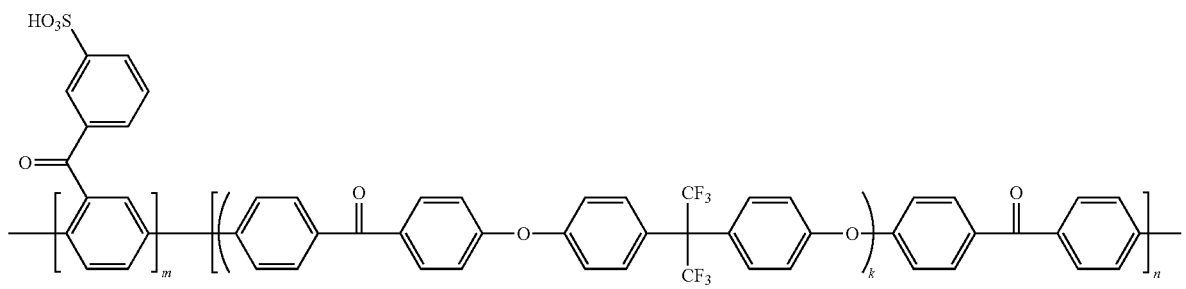

Comparative Example 4

Sulfonated Polymer PC

In a similar manner to Example 1, 39.4 g of the intended sulfonated polymer was obtained except that the monomers used to synthesize the copolymer of the sulfonic acid derivative protected by a neopentyl group were changed to 39.4 g (98.2 mmol) of 3-(2,5-dichlorobenzoyl)benzenesulfonic acid neopentyl synthesized in Synthesis Example 6 and 15.2 g (2.0 mmol) of the compound synthesized in Synthesis Example 9. The molecular weight of the sulfonated polymer after deprotection was Mn=57000 and Mw=190000. The ion-exchange capacity of the polymer was 2.30 meq/g. The resulting polymer having a sulfonic acid group was a compound expressed by the structural formula below (polymer PC). A proton conductive membrane was also prepared in a similar manner to Example 1, except that the polymer PC was used in place of the polymer P1A.

The carbon black and polytetrafluoroethylene (PTFE) particle were mixed in a mass ratio 4:6 of carbon black:PTFE particle, the resulting mixture was dispersed uniformly into ethylene glycol to prepare a slurry, and then the slurry was coated and dried on one side of carbon paper to form an underlying layer; consequently, two gas diffusion layers were prepared, which were formed of the underlying layer and the carbon paper.

The CCM was sandwich and supported at the side of the underlying layer of the gas diffusion layer and hot-pressed thereby to obtain a membrane-electrode assembly. The hot pressing was carried out under the conditions of 160° C. and 3 MPa for 5 minutes. In addition, the membrane-electrode assembly obtained in the Examples can constitute a solid polymer electrolyte fuel cell by further laminating a separator, which also acts as a gas pathway, on the gas diffusion layer.

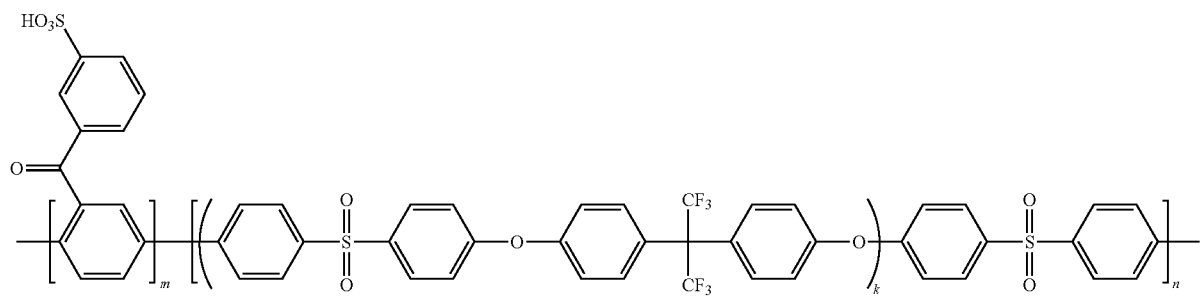

Preparation of Membrane-Electrode Assembly

Platinum particles were supported on carbon black (furnace black) having an average particle diameter of 50 nm in a mass ratio 1:1 of carbon black:platinum, thereby preparing catalyst particles. Next, the catalyst particles were dispersed uniformly into a solution of perfluoroalkylene sulfonic acid polymer compound (manufactured by DuPont Co., Nafion (product name)) as an ion conductive binder in a mass ratio 8:5 of ion conductive binder:catalyst particle, thereby preparing a catalyst paste.

The catalyst paste was coated on both sides of each of the proton conductive membranes formed of the polymers obtained in Examples 1 to 4 and Comparative Examples 1 to 4 by coating with a bar coater in an amount of 0.5 mg/cm$^2$ as platinum, and then dried, whereby electrode coated membranes (Catalyst Coated Membrane, hereinafter referred to as "CCM") were obtained. The drying was performed such that secondary drying was carried out at 140° C. for 10 minutes after drying at 100° C. for 15 minutes.

Evaluation of Power Generation Properties

Power generation performance was evaluated using the resulting membrane-electrode assembly under the conditions of a temperature of 70° C., relative humidity of 50%/73% at the fuel electrode side/oxygen electrode side, and 1 A/cm$^2$ of current density. Pure hydrogen was supplied to the fuel electrode side, and air was supplied to the oxygen electrode side. The power generation resistance was tested using the membrane-electrode assembly under the conditions of a temperature of 120° C., relative humidity of 50%/50% at fuel electrode side/oxygen electrode side, and OCV as an evaluation of power generation durability, and the time till cross-leak was measured. A time of at least 500 hours till cross-leak was considered to be good and is indicated by "O", whereas a time of less than 500 hours was considered to be inferior and is indicated by "X".

| Species of Sulfonated Polymer | Sulfonation Equivalent (meq/g) Set Value | Sulfonation Equivalent (meq/g) Measured Value | Nitrogen-Containing Heterocycle/Main Chain-Connecting Group | Proton Conductivity (S/cm) 90% Rh | Proton Conductivity (S/cm) 50% Rh | Power Generation Performance |
|---|---|---|---|---|---|---|
| Example 1 | P1A | 2.31 | 2.30 | 3-pyridine/—CO— | 0.303 | 0.030 | 0.605 |
| Example 2 | P2B | 2.31 | 2.30 | 4-pyridine/—CO— | 0.298 | 0.032 | 0.608 |
| Example 3 | P3A | 2.32 | 2.32 | 2-pyrrole/—CO— | 0.300 | 0.034 | 0.610 |
| Example 4 | P4C | 2.32 | 2.32 | 3-pyridine/—SO$_2$— | 0.304 | 0.033 | 0.611 |
| Comparative Example 1 | P6C | 2.30 | 2.23 | imidazolylbenzene/—CO— | 0.268 | 0.025 | 0.603 |
| Comparative Example 2 | PA | 2.31 | 2.31 | — | 0.297 | 0.032 | 0.607 |
| Comparative Example 3 | PB | 2.30 | 2.30 | — | 0.300 | 0.033 | 0.610 |
| Comparative Example 4 | PC | 2.30 | 2.30 | — | 0.302 | 0.031 | 0.605 |

| Species of Sulfonated Polymer | Heat Resistance 160° C. × 24 Hr Insoluble Content (%) | Chemical Durability Exposure to 5% Hydrogen Peroxide Retention of Molecular Weight (%) | Power Generation Durability |
|---|---|---|---|
| Example 1 | P1A | 0 | 64 | ○ |
| Example 2 | P2B | 0 | 45 | ○ |
| Example 3 | P3A | 0 | 66 | ○ |
| Example 4 | P4C | 0 | 70 | ○ |
| Comparative Example 1 | P6C | 0 | 65 | ○ |
| Comparative Example 2 | PA | 20 | 42 | ○ |
| Comparative Example 3 | PB | 15 | 33 | X |
| Comparative Example 4 | PC | 30 | 55 | X |

As shown in Tables 1 and 2, the membrane-electrode assembly, which is formed of the sulfonated polymer having a nitrogen-containing heterocyclic ring bonded through an electron-withdrawing group, can obtain superior heat resistance and chemical durability without degradation of the proton conductivity under a low humidity environment.

What is claimed is:

1. A membrane-electrode assembly for a solid polymer electrolyte fuel cell, wherein: an anode is provided on one side of a proton conductive membrane and a cathode is provided on another side thereof; and
   the proton conductive membrane is sulfonated polyarylene comprising a structure expressed by the general formula (1) below:

—R$^s$—Z—R$^h$ (1)

wherein in the formula (1), Z represents at least one structure selected from the group consisting of —CO—, —SO$_2$—, and —SO—; R$^s$ represents a direct bond or any divalent organic group; and R$^h$ represents a nitrogen-containing heterocyclic group.

2. The membrane-electrode assembly for a solid polymer electrolyte fuel cell according to claim 1, wherein the nitrogen-containing heterocyclic group in the general formula (1) is at least one group selected from the group consisting of pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline groups, and derivatives of nitrogen-containing heterocyclic groups thereof.

3. The membrane-electrode assembly for a solid polymer electrolyte fuel cell according to claim 1, wherein the sulfonated polyarylene further comprises a structure having a sulfonic acid group expressed by the general formula (2) below:

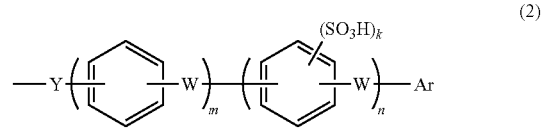

(2)

wherein in the formula (2), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4.

4. The membrane-electrode assembly for a solid polymer electrolyte fuel cell according to claim 2, wherein the sulfonated polyarylene further comprises a structure having a sulfonic acid group expressed by the general formula (2) below:

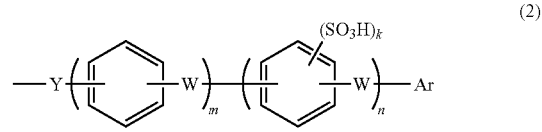

(2)

wherein in the formula (2), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4.

5. The membrane-electrode assembly for a solid polymer electrolyte fuel cell according to claim 1, wherein the sulfonated polyarylene comprises a structure expressed by the general formula (3) below and a structure expressed by the general formula (4) below:

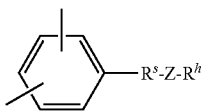
(3)

wherein in the formula (3), Z represents at least one structure selected from the group consisting of —CO—, —SO$_2$—, and —SO—; R$^s$ represents a direct bond or any divalent organic group; and R$^h$ represents a nitrogen-containing heterocyclic group;

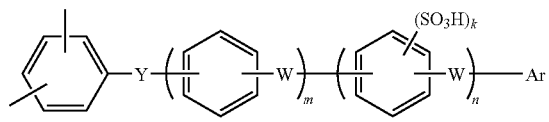
(4)

wherein in the formula (4), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4, wherein, among single lines at the edges of structural units, those displaying no substituent at one end indicate a connection with an adjacent structural unit.

6. The membrane-electrode assembly for a solid polymer electrolyte fuel cell according to claim 2, wherein the sulfonated polyarylene comprises a structure expressed by the general formula (3) below and a structure expressed by the general formula (4) below:

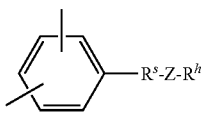
(3)

wherein in the formula (3), Z represents at least one structure selected from the group consisting of —CO—, —SO$_2$—, and —SO—; R$^s$ represents a direct bond or any divalent organic group; and R$^h$ represents a nitrogen-containing heterocyclic group;

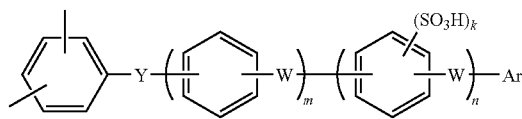
(4)

wherein in the formula (4), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4, wherein, the single lines at the edges of structural units, those displaying no substituent at one end indicate a connection with an adjacent structural unit.

7. The membrane-electrode assembly for a solid polymer electrolyte fuel cell according to claim 3, wherein the sulfonated polyarylene comprises a structure expressed by the general formula (3) below and a structure expressed by the general formula (4) below:

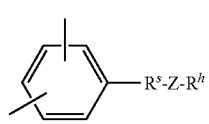
(3)

wherein in the formula (3), Z represents at least one structure selected from the group consisting of —CO—, —SO$_2$—, and —SO—; R$^s$ represents a direct bond or any divalent organic group; and R$^h$ represents a nitrogen-containing heterocyclic group;

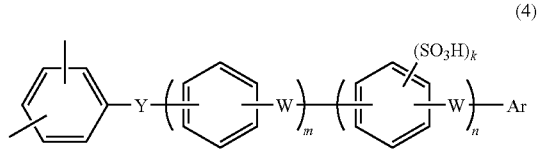
(4)

wherein in the formula (4), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4, wherein, among the single lines at the edges of structural units, those displaying no substituent at one end indicate a connection with an adjacent structural unit.

8. The membrane-electrode assembly for a solid polymer electrolyte fuel cell according to claim 4, wherein the sulfonated polyarylene comprises a structure expressed by the general formula (3) below and a structure expressed by the general formula (4) below:

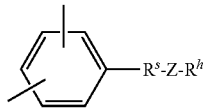
(3)

wherein in the formula (3), Z represents at least one structure selected from the group consisting of —CO—, —SO$_2$—, and —SO—; R$^s$ represents a direct bond or any divalent organic group; and R$^h$ represents a nitrogen-containing heterocyclic group;

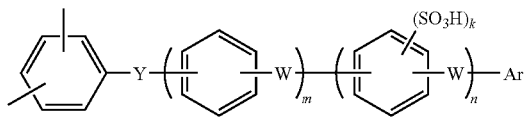
(4)

wherein in the formula (4), Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4, wherein, among the single lines at the edges of structural units, those displaying no substituent at one end indicate a connection with an adjacent structural unit.

9. The membrane-electrode assembly for a solid polymer electrolyte fuel cell according to claim 5, wherein the sulfonated polyarylene further comprises a structure expressed by the general formula (5) below:

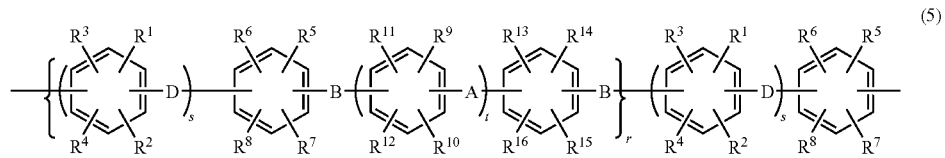
(5)

wherein in the formula (5), A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and flucrenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; and r represents an integer of 0 or at least 1, wherein, among the single lines at the edges of structural units, those displaying no substituent at one end indicate a connection with an adjacent structural unit.

10. The membrane-electrode assembly for a solid polymer electrolyte fuel cell according to claim 6, wherein the sulfonated polyarylene further comprises a structure expressed by the general formula (5) below:

wherein in the formula (5), A and 0 each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 10 to 10, —CR'$_2$—, wherein R' represents an aliphatic hydrocarbon group, aromatic hydrocarbon group, or halogenated hydrocarbon group, cyclohexylidene group, and fluorenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, allyl groups, aryl groups, nitro groups, and nitrile groups; s and t represent an integer of 0 to 4; and r represents an integer of 0 or at least 1, wherein, among the single lines at the edges of structural units, those displaying no substituent at one end indicate a connection with an adjacent structural unit.

11. The membrane-electrode assembly for a solid polymer electrolyte fuel cell according to claim 7, wherein the sulfonated polyarylene further comprises a structure expressed by the general formula (5) below:

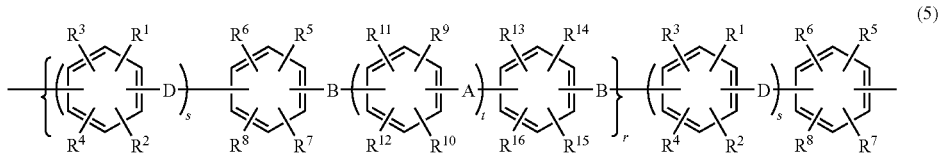
(5)

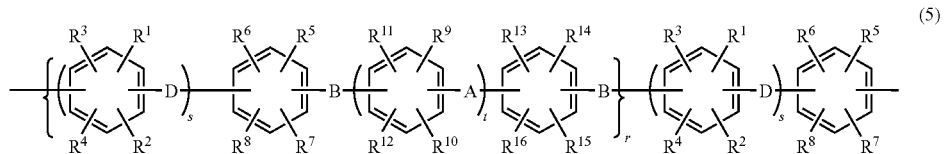

(5)

wherein in the formula (5), A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and fluorenilidene group; B independently represents an oxygen or sulfur atom; R1 to R16 may be identical or different from each other and represent at least one atom or group selected from the group consisting of a hydrogen atom, fluorine atom, alkyl groups, partially or entirely halogenated alkyl groups, allyl groups, aryl groups, nitro groups, and nitrile groups; s and t represent an integer of 0 to 4; and r represents an integer of 0 or at least 1, wherein, among the single lines at the edges of structural units, those displaying no substituent at one end indicate a connection with an adjacent structural unit.

12. The membrane-electrode assembly for a solid polymer electrolyte fuel cell according to claim 8, wherein the sulfonated polyarylene further comprises a structure expressed by the general formula (5) below:

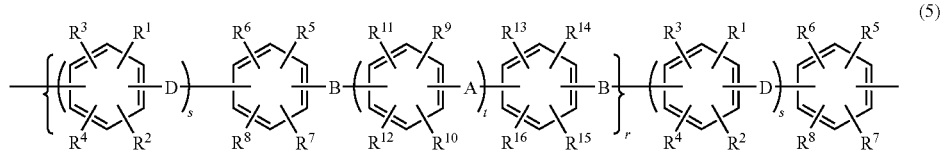

(5)

wherein in the formula (5), A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and fluorenilidene group; B independently represents an oxygen or sulfur atom; $R^1$ to $R^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; and r represents an integer of 0 or at least 1, wherein, among the single lines at the edges of structural units, those displaying no substituent at one end indicate a connection with an adjacent structural unit.

13. The membrane-electrode assembly for a solid polymer electrolyte fuel cell according to claim 9, wherein the sulfonated polyarylene comprises a structure expressed by the general formula (6) below:

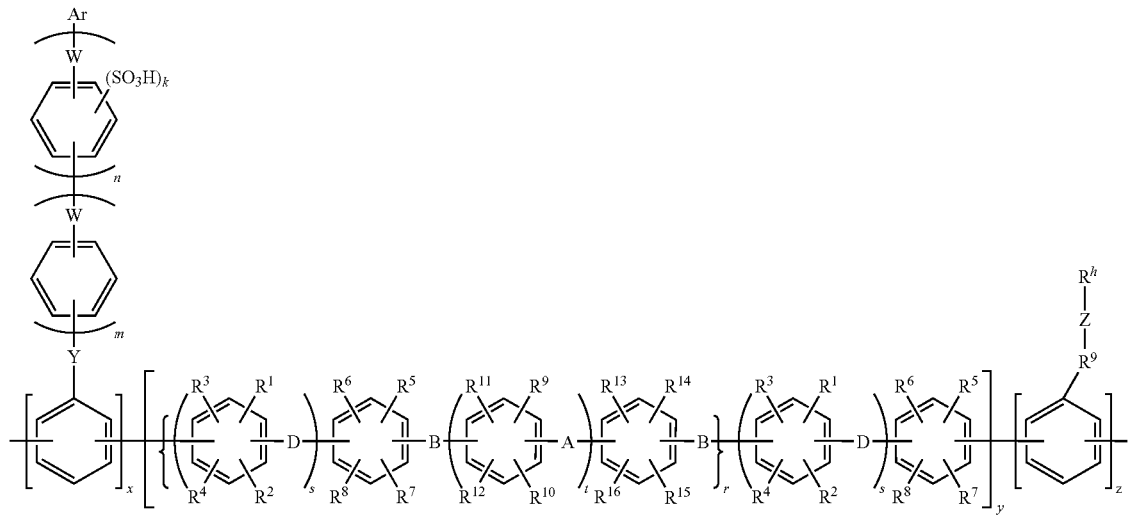

(6)

wherein in the formula (6), Z represents at least one structure selected from the group consisting of —CO—, —SO$_2$—, and —SO—; R$^s$ represents a direct bond or any divalent organic group; and R$^h$ represents a nitrogen-containing heterocyclic group; Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4; A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and flucrenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; r represents an integer of 0 or at least 1; x, y and z each represent a mol fraction provided that x+y+z=100; x is 99 to 85 mol %, y is 15 to 1 mol %, and z is 15 to 0.01 mol %, wherein, among the single lines at the edges of each structural unit, those displaying no substituent at one end indicate a connection with an adjacent structural unit.

14. The membrane-electrode assembly for a solid polymer electrolyte fuel cell according to claim 10, wherein the sulfonated polyarylene comprises a structure expressed by the general formula (6) below:

wherein in the formula (6), Z represents at least one structure selected from the group consisting of —CO—, —SO$_2$—, and —SO—; R$^s$ represents a direct bond or any divalent organic group; and R$^h$ represents a nitrogen-containing heterocyclic group; Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4; A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and flucrenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; r represents an integer of 0 or at least 1; x, y and z each represent a mol fraction provided that x+y+z=100; x is 99 to 85 mol %, y is 15 to 1 mol %, and z is 15 to 0.01 mol %, wherein, among the single lines at the edges of each structural unit, those displaying no substituent at one end indicate a connection with an adjacent structural unit.

15. The membrane-electrode assembly for a solid polymer electrolyte fuel cell according to claim 11, wherein the sulfonated polyarylene comprises a structure expressed by the general formula (6) below:

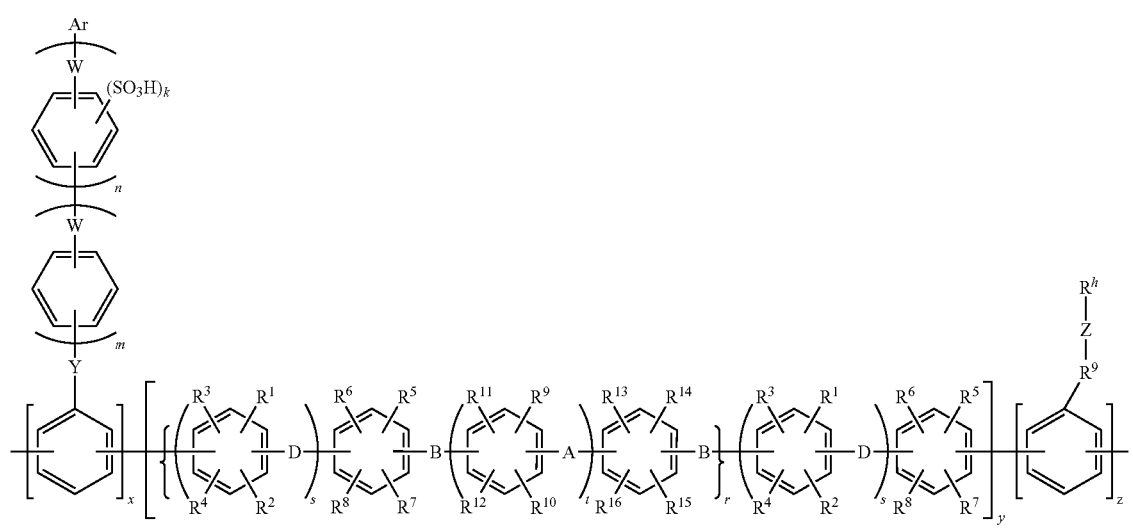

(6)

(6)

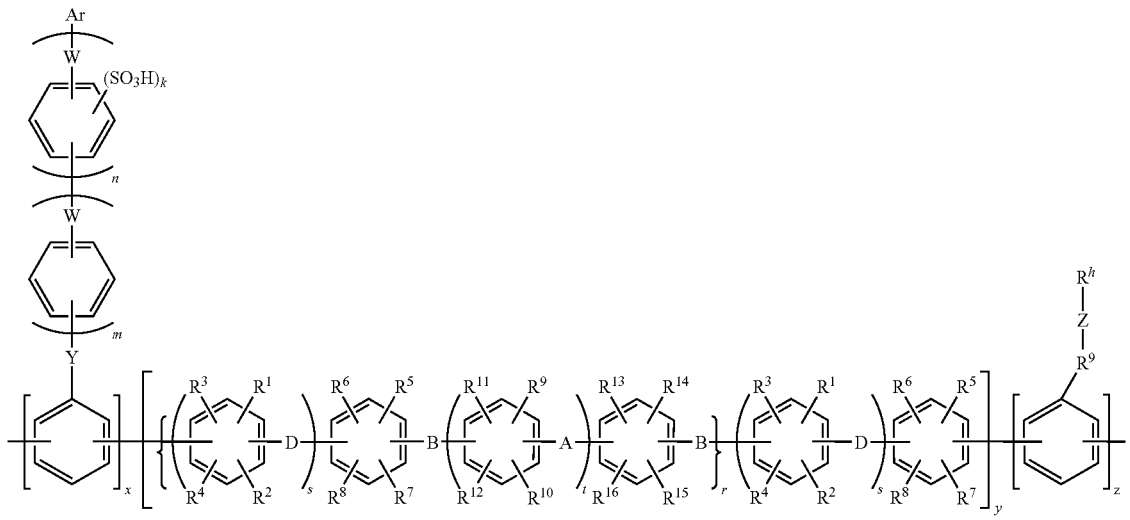

wherein in the formula (6), Z represents at least one structure selected from the group consisting of —CO—, —SO$_2$—, and —SO—; R$^s$ represents a direct bond or any divalent organic group; and R$^h$ represents a nitrogen-containing heterocyclic group; Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4; A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and flucrenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; r represents an integer of 0 or at least 1; x, y and z each represent a mol fraction provided that x+y+z=100; x is 99 to 85 mol %, y is 15 to 1 mol %, and z is 15 to 0.01 mol %, wherein, among the single lines at the edges of each structural unit, those displaying no substituent at one end indicate a connection with an adjacent structural unit.

16. The membrane-electrode assembly for a solid polymer electrolyte fuel cell according to claim 12, wherein the sulfonated polyarylene comprises a structure expressed by the general formula (6) below:

(6)

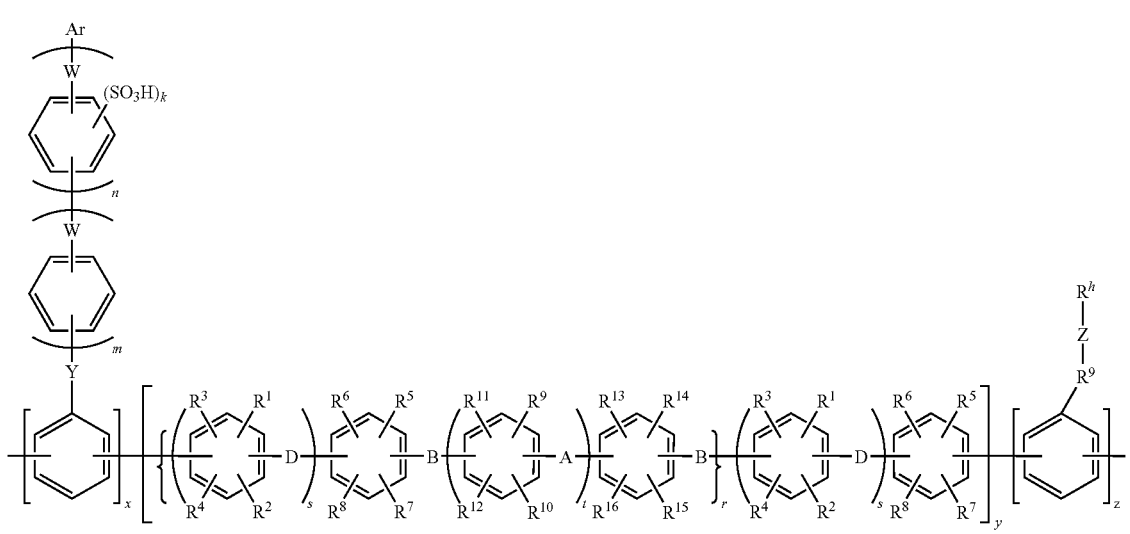

wherein in the formula (6), Z represents at least one structure selected from the group consisting of —CO—, —SO$_2$—, and —SO—; R$^s$ represents a direct bond or any divalent organic group; and R$^h$ represents a nitrogen-containing heterocyclic group; Y represents at least one structure selected from the group consisting of —CO—, —SO$_2$—, —SO—, —CONH—, —COO—, —(CF$_2$)$_l$—, wherein l is an integer of 1 to 10, and —C(CF$_3$)$_2$—; W represents a direct bond or at least one structure selected from the group consisting of —(CH$_2$)$_l$—, wherein l is an integer of 1 to 10, —C(CH$_3$)$_2$—, —O—, and —S—; and Ar represents an aromatic group having a substituent expressed by —SO$_3$H, —O(CH$_2$)$_h$SO$_3$H, or —O(CF$_2$)$_h$SO$_3$H, wherein h is an integer of 1 to 12; m represents an integer of 0 to 10; n represents an integer of 0 to 10; and k represents an integer of 1 to 4; A and D each independently represent at least one structure selected from the group consisting of a direct bond, —O—, —S—, —CO—, —SO$_2$—, —SO—, —CONH—, —COO—, —(CF$_2$)$_i$—, wherein i is an integer of 1 to 10, —(CH$_2$)$_j$—, wherein j is an integer of 1 to 10, —CR'$_2$—, wherein R' represents an aliphatic hydrocarbon group, aromatic hydrocarbon group, or halogenated hydrocarbon group, cyclohexylidene group, and flucrenilidene group; B independently represents an oxygen or sulfur atom; R$^1$ to R$^{16}$ may be identical or different from each other and represent at least one atom or group selected from the group consisting of a hydrogen atom, fluorine atom, alkyl groups, partially or entirely halogenated alkyl groups, ally' groups, aryl groups, nitro groups, and nitrile groups; s and t represent an integer of 0 to 4; r represents an integer of 0 or at least 1; x, y and z each represent a mol fraction provided that x+y+z=100; x is 99 to 85 mol %, y is 15 to 1 mol %, and z is 15 to 0.01 mol %, wherein, among the single lines at the edges of each structural unit, those displaying no substituent at one end indicate a connection with an adjacent structural unit.

* * * * *